(12) United States Patent
Sugiyama et al.

(10) Patent No.: US 11,460,478 B2
(45) Date of Patent: Oct. 4, 2022

(54) TRANSFER APPARATUS, SAMPLE PROCESSING SYSTEM, AND CONVEYANCE METHOD

(71) Applicants: Hitachi, Ltd., Tokyo (JP); Hitachi Industrial Equipment Systems Co., Ltd., Tokyo (JP)

(72) Inventors: Kenta Sugiyama, Tokyo (JP); Shigeki Okuno, Tokyo (JP); Kunihiro Fujiki, Tokyo (JP); Yoshinori Takeyama, Tokyo (JP); Hidehiko Fushimi, Tokyo (JP); Hideaki Kataho, Tokyo (JP)

(73) Assignees: Hitachi, Ltd., Tokyo (JP); Hitachi Industrial Equipment Systems Co., Ltd., Tokyo (JP)

( * ) Notice: Subject to any disclaimer, the term of this patent is extended or adjusted under 35 U.S.C. 154(b) by 341 days.

(21) Appl. No.: 16/781,380

(22) Filed: Feb. 4, 2020

(65) Prior Publication Data

US 2020/0256883 A1   Aug. 13, 2020

(30) Foreign Application Priority Data

Feb. 8, 2019   (JP) .............................. JP2019-021519

(51) Int. Cl.
*G01N 35/00* (2006.01)
*G01N 35/04* (2006.01)

(52) U.S. Cl.
CPC ... *G01N 35/00732* (2013.01); *G01N 35/0099* (2013.01); *G01N 35/04* (2013.01); *G01N 2035/00752* (2013.01); *G01N 2035/0465* (2013.01)

(58) Field of Classification Search
CPC . G01N 2035/00752; G01N 2035/0465; G01N 35/00732; G01N 35/0092; G01N 35/0099; G01N 35/04
See application file for complete search history.

(56) References Cited

U.S. PATENT DOCUMENTS

| | | | |
|---|---|---|---|
| 2014/0037517 A1* | 2/2014 | Takai | B65G 65/00 209/552 |
| 2015/0093290 A1 | 4/2015 | Takai et al. | |
| 2015/0192598 A1 | 7/2015 | Yasuzawa et al. | |
| 2016/0244269 A1* | 8/2016 | Akutsu | G01N 35/04 |
| 2017/0185815 A1 | 6/2017 | Itoh | |
| 2020/0209268 A1* | 7/2020 | Tajima | C12Q 1/6844 |

FOREIGN PATENT DOCUMENTS

| | | | |
|---|---|---|---|
| JP | 2001-141732 A | | 5/2001 |
| JP | 2001-159635 A | | 6/2001 |
| JP | 2002356209 | * | 12/2002 |
| JP | 2007-078363 A | | 3/2007 |
| JP | 2014-048215 A | | 3/2014 |
| JP | 2015-068727 A | | 4/2015 |
| JP | 2017-120206 A | | 7/2017 |

* cited by examiner

*Primary Examiner* — Jennifer Wecker
*Assistant Examiner* — Jonathan Bortoli
(74) *Attorney, Agent, or Firm* — Foley & Lardner LLP

(57) ABSTRACT

In a first transfer station, a second transfer station, and a third transfer station, a plurality of sample containers are transferred while being stored from a transfer source rack to a transfer destination rack row. In this case, for each of the sample containers to be a transfer target, a specific transfer destination rack is selected from the transfer destination rack row based on a content of processing to be applied in the future to a sample within the sample container.

12 Claims, 14 Drawing Sheets

| TYPE | PROCESSING CODE | ERROR | PRE-ANALYTICAL PROCESSING SECTION | | INSPECTION SECTION | TRANSFER DESTINATION RACK |
|---|---|---|---|---|---|---|
| | | | CENTRIFUGATION | ALIQUOT METHOD | | |
| 1 | ***** | | UNREQUIRED | 1:1 | (RESORTING ACCORDING TO INSPECTION CODE) | #1 |
| 2 | ***** | | UNREQUIRED | 1:N | | #2 |
| 3 | ***** | N | REQUIRED | 1:1 | | #3 |
| 4 | ***** | | REQUIRED | 1:N | | #4 |
| 5 | ***** | | REQUIRED | UNREQUIRED | | #5 |
| 6 | ***** | | (SKIP) | | BLOOD COUNT TEST | #6 |
| 7 | ***** | | (SKIP) | | BLOOD GLUCOSE TEST | #7 |
| 8 | ***** | Y | | | | #8 |

FIG. 6

| TEST CODE 246 | TRANSFER UNIT IN CHARGE 248 | TRANSFER DESTINATION RACK 250 |
|---|---|---|
| ******* | ***** | #1 |
| ******* | ***** | #2 |
| ******* | ***** | #3 |
| ⋮ | ⋮ | ⋮ |
| ⋮ | ⋮ | ⋮ |
| ******* | ***** | #179 |
| ******* | ***** | #180 |

252 covers #1–#3 (and ⋮); 254 covers #179–#180.

FIG. 10

| TYPE | POST-ANALYTICAL PROCESSING CODE | POST-ANALYTICAL PROCESSING | | TRANSFER DESTINATION RACK |
|---|---|---|---|---|
| | | STORAGE METHOD | ANOTHER PROCESSING | |
| 1 | ***** | REFRIGERATION | Y | #1 |
| 2 | ***** | REFRIGERATION | N | #2 |
| 3 | ***** | FREEZING | Y | #3 |
| 4 | ***** | FREEZING | N | #4 |
| 5 | ***** | RETURN | | #5 |
| 6 | ***** | ERROR | | #6 |

FIG. 11

TRANSFER APPARATUS, SAMPLE PROCESSING SYSTEM, AND CONVEYANCE METHOD

CROSS REFERENCE TO RELATED APPLICATION

This application claims priority to Japanese Patent Application No. 2019-021519 filed on Feb. 8, 2019, which is incorporated herein by reference in its entirety including the specification, claims, drawings, and abstract.

TECHNICAL FIELD

The present disclosure generally relates to a transfer apparatus, a sample processing system, and a conveyance method, and more particular to a technique for conveying a sample container containing a sample.

BACKGROUND

A sample processing system is a system for processing a sample such as blood, urine, or feces collected from a human body. A typical sample processing system includes a sample pre-analytical processing apparatus, a sample inspection apparatus (in other words, a sample examination apparatus or a sample testing apparatus), a rack conveyance apparatus, and the like.

The sample pre-analytical processing apparatus is an apparatus that subjects a sample to pre-analytical processing prior to inspection of the sample. Examples of the pre-analytical processing include centrifugation processing, stopper opening processing, aliquot processing (or pipetting processing), and stopper closing processing. The aliquot processing is for sucking in a first sample from a first sample container (or a first sample tube) and discharging the first sample to one or a plurality of second sample containers (or one or a plurality of second sample tubes), to produce one or a plurality of second samples. The first sample container is generally referred to as a parent sample container (or an original sample container), and a sample contained therein is generally referred to as a parent sample (or an original sample). The second sample container is generally referred to as a daughter sample container, and a sample contained therein is generally referred to as a daughter sample. Judgment is made for each of the samples as to whether or not pre-analytical processing is required for the sample, depending on a content of inspection to be applied to the sample and the nature of the content.

The sample inspection apparatus is an apparatus that performs inspection of a sample. If the sample is blood, examples of the inspection of the blood include an immunological test, a biochemical test, a blood count test, and a blood glucose test. Examples of the sample inspection apparatus include a sample inspection apparatus that performs inspection of a daughter sample produced by pre-analytical processing and a sample inspection apparatus that performs inspection of a sample that is not subjected to pre-analytical processing.

The rack conveyance apparatus is an apparatus that conveys a plurality of sample containers in a rack unit. The rack conveyance apparatus feeds a rack to the sample pre-analytical processing apparatus, and the rack after pre-analytical processing is fed to the sample inspection apparatus from the sample pre-analytical processing apparatus. The rack after inspection is fed to an apparatus that performs post-analytical processing.

SUMMARY

In a sample processing system, a conveyance destination of each of sample containers is determined in a rack unit. That is, a group in which a plurality of sample containers held in a certain rack are conveyed together is configured. In other words, a group in which a plurality of samples within the sample containers are conveyed together (hereinafter referred to as a simultaneous feeding sample group) is configured. However, a configuration of the current simultaneous feeding sample group may be inappropriate when viewed from the viewpoint of future processing for each of the samples constituting the simultaneous feeding sample group. This causes some problems. For example, a sample processing efficiency is not enhanced, and rack conveyance becomes complicated. Particularly, the problem becomes significant in a large-scale sample processing system including a large number of apparatuses.

JP 2001-159635 A discloses a large-sized pre-analytical processing system including a plurality of sub-lines. JP 2017-120206 A describes an apparatus that sorts sample containers into conveyance lines respectively corresponding to test items. However, neither of the patent documents discloses a mechanism capable of changing the configuration of the simultaneous feeding sample group.

It is an advantage of the present disclosure to implement sample container conveyance in which a sample processing efficiency is enhanced. Alternatively, it is an advantage of the present disclosure to configure a simultaneous feeding sample group adapted to certain processing prior to the processing on the premise that a plurality of samples are grouped in a rack unit.

According to an aspect of the present disclosure, there is provided a transfer apparatus including a container transfer mechanism that transfers while sorting a plurality of sample containers from a transfer source rack to a transfer destination rack row, and a control unit that controls the container transfer mechanism and selects for each of the sample containers a specific transfer destination rack from the transfer destination rack row as a transfer destination of the sample container based on information representing a content of processing to be applied in the future to a sample within the sample container.

According to another aspect of the present disclosure, there is provided a sample processing system including a plurality of sections provided from an upstream side to a downstream side in rack conveyance, and a plurality of transfer stations provided among the plurality of sections, in which each of the transfer stations includes a container transfer mechanism that transfers while sorting a plurality of sample containers from a transfer source rack fed in from an upstream section to a transfer destination rack row, a specific transfer destination rack is selected, for each of the sample containers to be a transfer target, from the transfer destination rack row as a transfer destination of the sample container based on information representing a content of processing to be applied in the future to a sample within the sample container in each of the transfer stations, and a transfer completion rack is conveyed from each of the transfer stations to a downstream section.

According to still another aspect of the present disclosure, there is provided a conveyance method in a sample processing system including a plurality of sections provided from an upstream side to a downstream side in rack conveyance, the conveyance method including the steps of transferring while sorting a plurality of sample containers from a transfer source rack fed in from an upstream section to a transfer destination rack row in a transfer station provided between at least two of the sections, and conveying a transfer completion rack from the transfer station to a downstream section, in which in the step of transferring while sorting the sample containers, a specific transfer destination rack is selected, for each of the sample containers to be a transfer target, from the transfer destination rack row as a transfer destination of the sample container based on a content of processing to be applied in the future to a sample within the sample container.

According to the present disclosure, a sample processing efficiency is enhanced. Alternatively, a simultaneous feeding sample group adapted to certain processing prior to the processing can be configured on the premise that a plurality of samples are grouped in a rack unit.

BRIEF DESCRIPTION OF DRAWINGS

An embodiment of the present disclosure will be described based on the following figures, wherein:

FIG. 6 is an explanatory diagram illustrating an example of a sorting and transfer condition in the first transfer station;

FIG. 10 is an explanatory diagram illustrating an example of a transfer management table to be referred to in controlling the second transfer station;

FIG. 11 is an explanatory diagram illustrating an example of a sorting and transfer condition in a third transfer station;

DESCRIPTION OF EMBODIMENTS

Figure 1:
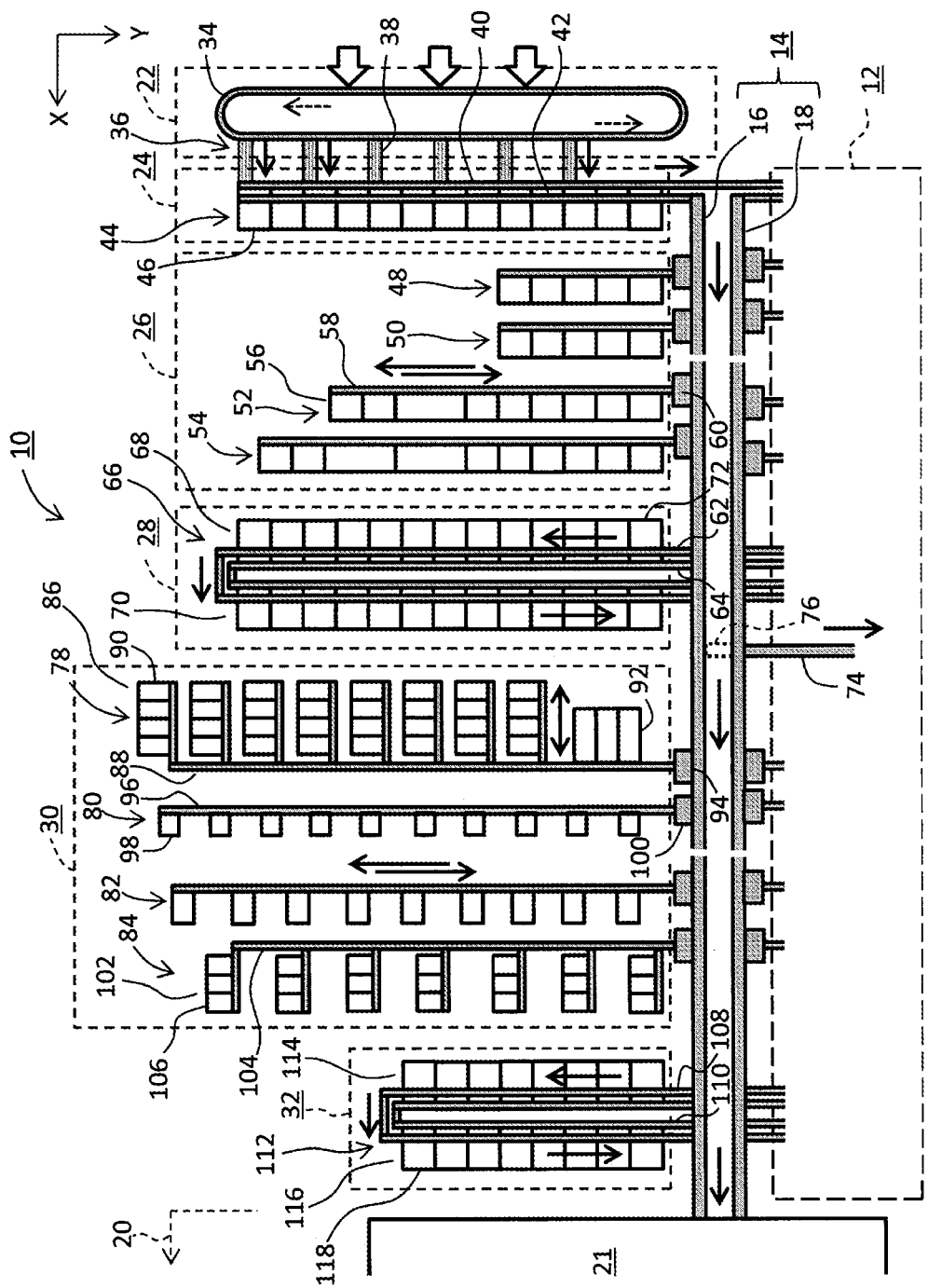
FIG. 1 is a plan view illustrating an example of an equipment layout in a sample processing system according to an embodiment.

An embodiment will be described below with reference to the drawings.

(1) Overview of Embodiment

A transfer apparatus according to an embodiment includes a container transfer mechanism and a control unit. The container transfer mechanism is a mechanical device or a machine that transfers while sorting a plurality of sample containers from a transfer source rack to a transfer destination rack row. The control unit is a control device or a controller that controls the container transfer mechanism, and selects for each of the sample containers a specific transfer destination rack from the transfer destination rack row as a transfer destination of the sample container based on information representing a content of processing to be applied in the future to a sample within the sample container.

The above-described configuration enables the plurality of sample containers to be transferred while being sorted while considering the content of the processing to be applied in the future to each of the samples. Typically, a plurality of samples to which the same processing is applied or processing partially having commonality is applied are grouped, and are collectively conveyed. That is, according to the above-described configuration, a configuration of a simultaneous feeding sample group is optimized. Accordingly, a rack conveyance efficiency can be enhanced and at the same time, a processing efficiency in a downstream section is enhanced.

The transfer destination rack row includes a plurality of transfer destination racks corresponding to the number of sorts in the embodiment. A plurality of transfer units constituting the transfer apparatus may perform a sorting and transfer operation in parallel. In this case, each of the transfer units may take charge of a part of the entire sorting and transfer operation. The container transfer mechanism is a mechanism that conveys the sample container using a manipulator in the embodiment described below. The sample container may be transferred using another method. Examples of information representing a content of processing to be applied in the future to the sample include instruction information from a host system, a processing code associated with a sample ID, and information to be obtained from an analysis result of a sample container image.

In the present embodiment, the transfer apparatus is provided between an upstream section and the downstream section, and the transfer source rack is fed into the transfer apparatus from the upstream section, and a transfer completion rack is fed out of the transfer apparatus to the downstream section. This configuration enables the plurality of sample containers to be grouped again by performing sorting and transfer among the racks between the upstream section and the downstream section. That is, a simultaneous feeding sample group adapted to a content of processing in the downstream section can be reconfigured. Each of the sections includes a single apparatus or an apparatus group that processes samples.

The transfer apparatus according to the present embodiment includes the plurality of transfer units provided between the upstream section and the downstream section, each of the transfer units includes the container transfer mechanism, and the plurality of container transfer mechanisms respectively included in the plurality of transfer units operate in parallel. This configuration enables performance of sorting and transfer of large amounts of sample containers in a short time period. The number of transfer units to be actually operated may be determined depending on a load. The load can be specified as the number of sample containers to be processed per unit time, for example.

In the present embodiment, the downstream section is a pre-analytical processing section that is provided on the upstream side of an inspection section that performs sample inspection and performs sample pre-analytical processing, and a content of processing to be applied in the future includes at least a content of the sample pre-analytical processing. The sample pre-analytical processing is for subjecting the sample to required processing such as aliquot processing prior to the sample inspection. If sorting and transfer are performed prior to the sample pre-analytical processing, a processing efficiency in the pre-analytical processing section is enhanced. In the sorting and transfer, sample containers for which sample pre-analytical processing is not required may be grouped, sample containers with any error may be grouped, or sample containers for which sample inspection is manually performed may be grouped.

In the present embodiment, the transfer destination rack row includes a plurality of transfer destination racks respectively corresponding to a plurality of sample pre-analytical processing types in sample pre-analytical processing and a plurality of transfer destination racks respectively corresponding to a plurality of sample inspection types in sample inspection, and the content of processing to be applied in the future further includes a content of the sample inspection. The configuration enables the plurality of sample containers to be grouped depending on the sample pre-analytical processing types and the sample inspection types in sorting and transfer. For example, in a stage preceding the pre-analytical processing section, the sample containers for which the pre-analytical processing section is skipped may be grouped for each of the sample inspection types. In the case, the sample containers need not be sorted immediately before the sample inspection or in a stage of the sample inspection.

In the present embodiment, the upstream section is a pre-analytical processing section that performs sample pre-analytical processing, and the downstream section is an inspection section that performs sample inspection, and the content of processing to be applied in the future includes a content of the sample inspection. The configuration causes sorting and transfer to be applied to a plurality of sample containers fed out of the pre-analytical processing section. As a result, a processing efficiency in the inspection section is enhanced. For the sorting and transfer, a sample container to be fed to another inspection section on another floor, a sample container to be manually inspected, a sample container with any error, and the like may be sorted.

In the present embodiment, the upstream section is an inspection section that performs sample inspection, and the downstream section is a post-analytical processing section that performs sample post-analytical processing, and the content of processing to be applied in the future includes at least a content of the sample post-analytical processing. The configuration causes a processing efficiency in the sample post-analytical processing to be enhanced. A concept of the sample post-analytical processing can include storage, return, and the like. A sorting condition may be determined in consideration of a storage method or the like.

A sample processing system according to the embodiment includes a plurality of sections provided from an upstream side to a downstream side in rack conveyance and a plurality of transfer stations provided among the plurality of sections. Each of the transfer stations includes a container transfer mechanism that transfers while sorting a plurality of sample containers from a transfer source rack fed in from an upstream section to a transfer destination rack row. In each of the transfer stations, a specific transfer destination rack is selected, for each of the sample containers to be a transfer target, from the transfer destination rack row as a transfer destination of the sample container based on information representing a content of processing to be applied in the future to a sample within the sample container. A transfer completion rack is conveyed from each of the transfer stations to a downstream section.

According to the above-described configuration, the plurality of transfer stations respectively function as interfaces, and a plurality of sorting and transfer operations can be performed in time among the plurality of sections existing in stages. As a result, a processing efficiency in each of the sections and a rack conveyance efficiency within the system are enhanced. Particularly, in a large-scale sample processing system including various apparatuses, the above-described configuration is desirably adopted.

A plurality of sections and a plurality of stations are desirably connected to a backbone conveyance line. Specific examples of the plurality of sections include a carry-in section, a pre-analytical processing section, an inspection section, and a post-analytical processing section. Specific examples of the plurality of transfer stations include a first transfer station, a second transfer station, and a third transfer station. The first transfer station is for performing sorting and transfer of parent sample containers. The second transfer station is for transferring both or one of parent sample containers and daughter sample containers. The third transfer station is for transferring both or one of parent sample containers. A transfer target in each of the transfer stations can be approximately determined depending on a purpose and a specific situation of the sample processing system.

A conveyance method according to the embodiment is a conveyance method in a sample processing system including a plurality of sections provided from an upstream side to a downstream side in rack conveyance, the conveyance method including a process for transferring while sorting a plurality of sample containers from a transfer source rack fed in from an upstream section to a transfer destination rack row in a transfer station provided between at least two of the sections, and a process for conveying a transfer completion rack from the transfer station to a downstream section. In the process for transferring while sorting the sample containers, a specific transfer destination rack is selected, for each of the sample containers to be a transfer target, from the transfer destination rack row as a transfer destination of the sample container based on a content of processing to be applied in the future to a sample within the sample container.

(2) Details of Embodiment

FIG. 1 illustrates an equipment layout in a sample processing system according to the embodiment. The illustrated sample processing system is a large-scale sample processing system that processes a large number of samples fed from a medical institution. All or some of components described below may be applied to other sample processing systems, e.g., a small-scale sample processing system, a sample pre-analytical processing system, and a sample inspection system. In the illustrated sample processing system, examples of the sample include blood, urine, and feces collected from a living body. Although the plurality of types of samples are set as a processing target, one type of sample (e.g., blood) may be set as a processing target.

In FIG. 1, the sample processing system includes a first sub-system 10, a second sub-system 12, and a backbone conveyance mechanism 14. The first sub-system 10 and the second sub-system 12 are provided on both sides with the backbone conveyance mechanism 14 interposed therebetween. The first sub-system 10 and the second sub-system 12, excluding their respective parts (specifically, carry-in section 22 in the first sub-system 10), basically have the same configuration, and their respective layouts are basically symmetrical with each other.

Both the first sub-system 10 and the second sub-system 12 are used if a processing load is high, and one of the first sub-system 10 and the second sub-system 12 is used if the processing load is low. As a result, a reasonable operation appropriate to the load can be implemented. Even when a failure has occurred in one of the sub-systems, the other sub-system can be operated. Thus, a risk of an operation stop over the entire sample processing system can be reduced.

The backbone conveyance mechanism 14 includes a first backbone conveyance line 16 and a second backbone conveyance line 18 in an illustrated configuration example. A plurality of sections and a plurality of transfer stations within the first sub-system 10 are connected to the first backbone conveyance line 16. Similarly, a plurality of sections and a plurality of transfer stations within the second sub-system 12 are connected to the second backbone conveyance line 18. A final end of the backbone conveyance mechanism 14 is connected to a post-analytical processing section 20 that performs post-analytical processing. The post-analytical processing section 20 includes a storage container 21.

Out of the first sub-system 10 and the second sub-system 12, the first sub-system 10 is represented below, to describe its configuration and omit description of the second sub-system 12. An X-direction is a direction of rack conveyance by the backbone conveyance mechanism 14, and a Y-direction is a direction perpendicular to the X-direction. The right side and the left side of a paper plane are respectively an upstream side in rack conveyance and a downstream side in rack conveyance.

In FIG. 1, the first sub-system 10 includes the carry-in section 22, a first transfer station 24, a pre-analytical processing section 26, a second transfer station 28, an inspection section 30, and a third transfer station 32 that are provided from the upstream side to the downstream side. The post-analytical processing section 20 is provided on the downstream side of the third transfer station 32. Each of the sections will be specifically described below.

First, the carry-in section 22 will be described. The carry-in section 22 includes a loop-shaped conveyor 34 and a transfer robot group 36 in an illustrated configuration example. A worker lowers a plurality of container boxes from a delivery truck, and the container boxes are placed on a conveyance surface of the loop-shaped conveyor 34. The loop-shaped conveyor 34 is a conveyance apparatus that intermittently operates to rotate, for example. Alternatively, another conveyance apparatus may be provided.

Each of the container boxes is fed from the medical institution, and a plurality of racks are contained in the container box. Each of the racks is a member for holding tens of sample containers, for example. Each of the sample containers contains a sample as an inspection request target. A bar code label is affixed to an outer surface of each of the sample containers to manage the sample. Alternatively, a chip such as an RF-ID may be used. Representative examples of the sample container include a blood collection tube.

The transfer robot group 36 includes a plurality of transfer robots 38 arranged in the Y-direction in the illustrated configuration example. Each of the transfer robots 38 has a function of sequentially taking out and transferring the plurality of racks within the container box in an unloaded state. Each of the racks taken out by each of the transfer robots 38 is inputted into the first transfer station 24. Each of the transfer robots 38 may unload the container box.

In the configuration example illustrated in FIG. 1, a conveyance path 40 having a form extending in the Y-direction is provided to span the first sub-system 10 and the second sub-system 12. A rack conveyance direction in the conveyance path 40 is a +Y-direction. A conveyance path 42 is provided parallel to the conveyance path 40. The conveyance path 42, together with the conveyance path 40, crosses the first transfer station within the first sub-system 10 in the Y-direction. A similar conveyance path to the conveyance path 42 is also provided in a first transfer station within the second sub-system 12.

In the illustrated configuration example, the plurality of racks transferred by the transfer robot group 36 are placed on the conveyance path 40, for example. The plurality of racks are distributed in a transfer unit group 44 constituting the transfer apparatus via the conveyance path 40. Some or all of the racks are fed from the first sub-system 10 to the second sub-system 12 using the conveyance path 40. A conveyance path dedicated to rack distribution may be provided adjacent to or parallel to the conveyance paths 40 and 42 within each of the first sub-system 10 and the second sub-system 12.

A plurality of buffer areas where the plurality of racks transferred by the plurality of transfer robots 38 are respectively temporarily placed may be provided within the first sub-system 10. Alternatively, the plurality of racks may be respectively directly transferred to a plurality of transfer units 46 from the plurality of transfer robots 38. The plurality of transfer robots 38 may be respectively replaced with a plurality of other transfer mechanisms. In each of the conveyance paths within the sample processing system, each of the racks is conveyed using a conveyor belt, a roller train, a feed pawl, or the like.

Then, the first transfer station 24 will be described. The first transfer station 24 is provided between the carry-in section 22 on the upstream side and the pre-analytical processing section 26 on the downstream side. The first transfer station 24 includes the transfer unit group 44 constituting the transfer apparatus, as already described. The transfer unit group 44 includes the plurality of transfer units 46 arranged in the Y-direction, and the plurality of transfer units 46 are independently operated in parallel. Each of the transfer units 46 has a function of sorting and transferring a plurality of sample containers from a transfer source rack to a transfer destination rack row, as described in detail below. That is, a transfer destination of each of the sample containers is selected depending on a content of processing to be applied in the future to a sample within the sample container (specifically, a content of pre-analytical processing and a content of inspection) when the sample container is transferred.

The sorting for the plurality of sample containers is re-grouping for the plurality of sample containers if viewed differently. As a result, a simultaneous feeding sample group adapted to processing in succeeding stages is configured. The above-described transfer destination rack row includes a plurality of transfer destination racks respectively corresponding to a plurality of sorting types (or a plurality of sorting items). The sorting and transfer of the sample containers are performed by a container transfer mechanism, and is specifically performed by a container conveyance apparatus including a manipulator. Although in the embodiment the plurality of transfer units 46 respectively have the same function, the function of some of the transfer units 46 may be made different from the function of the some other transfer units 46.

In each of the transfer units 46, the transfer source rack is discharged in a stage where it becomes empty. The empty rack is fed out to a recovery conveyance path (not illustrated), or is fed to a recovery station (not illustrated) via the conveyance path 40, for example. Then, a new rack, which holds a plurality of sample containers, is taken in from the conveyance path 40, and the rack is a new transfer source rack. Each of transfer destination racks is fed out to the conveyance path 42 as a transfer completion rack when a fully loaded state has been reached or when a timeout condition has been satisfied, and is then fed out to the first backbone conveyance line 16. After the transfer completion rack is discharged, an empty rack as an alternative thereto is replenished as a transfer destination rack. A configuration and an operation of each of the transfer units 46 will be described in detail below with reference to FIG. 4 to FIG. 6.

In the present embodiment, an image of each of the sample containers is picked up, to acquire a container image in a sorting and transfer process in each of the transfer units 46. The container image is used in container type judgment (i.e., processing type judgment), and is used to identify an error sample. In the sorting and transfer process, respective directions of bar code labels affixed to the sample containers are aligned, and are optically read. A part of the conveyance path 40 and the conveyance path 42, described above, can be respectively grasped as components in the first transfer station 24. Both the carry-in section 22 and the first transfer station 24 are together considered as a reception section. A bar code label is affixed to each of the racks, and the bar code label is read in a conveyance process.

Then, the pre-analytical processing section 26 will be described. The pre-analytical processing section 26 applies pre-analytical processing to each of samples prior to inspecting the sample. In the illustrated configuration example, the pre-analytical processing section 26 includes a plurality of pre-analytical processing apparatuses 48 to 54 connected in parallel with the first backbone conveyance line 16. The pre-analytical processing apparatuses are installed in parallel in a comb shape, and the number of the pre-analytical processing apparatuses is 10, for example. All numerical values described in the specification of the present application are exemplary.

The plurality of pre-analytical processing apparatuses 48 to 54 include various pre-analytical processing apparatuses respectively having different configurations, and include a pre-analytical processing apparatus group including the plurality of pre-analytical processing apparatuses having the same configuration. In the configuration example illustrated in FIG. 1, the pre-analytical processing apparatus 48 and the pre-analytical processing apparatus 50 have the same configuration, and respectively operate independently and in parallel, for example. The pre-analytical processing apparatus 52 has its specific configuration, and the pre-analytical processing apparatus 54 also has its specific configuration. When the plurality of pre-analytical processing apparatuses having the same configuration are installed in parallel, the number of pre-analytical processing apparatuses to be operated depending on a load can be varied. If a failure has occurred in the certain pre-analytical processing apparatus, the pre-analytical processing apparatus can be backed up by the other pre-analytical processing apparatus having the same configuration.

Each of the pre-analytical processing apparatuses 48 to 54 includes a plurality of units arranged in the Y-direction, and the plurality of units are connected to an in-apparatus conveyance path extending in the Y-direction. The in-apparatus conveyance path conveys the rack in the Y-direction, and a forward direction and a backward direction are respectively the −Y-direction and the the +Y-direction. For example, the pre-analytical processing apparatus 52 includes a plurality of units 56 arranged in the Y-direction, and the units 56 are connected to an in-apparatus conveyance path 58. Each of the units performs specific processing. Examples of the specific processing include centrifugation processing, stopper opening processing, aliquot processing, property analysis processing, and stopper closing processing. For example, the plurality of units that perform the same pre-analytical processing may be provided and operated in parallel.

In the centrifugation processing, a blood collection tube as a sample container is set in a centrifuge, and the centrifuge applies a centrifugal force to a sample within the blood collection tube. As a result, within the blood collection tube, a serum layer and a clot layer respectively occur on the upper side and the lower side with a separating agent interposed therebetween. If the sample container is provided with a stopper, the sample container is subjected to stopper opening processing prior to aliquot processing. That is, the stopper is removed, or the stopper is processed such that a aliquot nozzle can be inserted into the sample container. Examples of the stopper include a rubber stopper and a seal stopper.

In the aliquot processing, a sample is sucked in from a sample container by the aliquot nozzle, and is discharged to one or a plurality of other containers. A sample before aliquot is referred to as a parent sample, and a sample produced by aliquot is referred to as a daughter sample, as previously described. Each of daughter samples is an inspection target. Some of tests are applied to a sample that is not subjected to pre-analytical processing. In the aliquot processing, a daughter sample rack that holds a plurality of daughter sample containers is produced. The daughter sample rack is fed from the in-apparatus conveyance path to the first backbone conveyance line 16.

In the stopper closing processing, a stopper is attached to a sample container after the aliquot processing. This is for preventing contamination of a foreign substance, for example, in a process for storing remaining parent samples. A parent sample rack storing a plurality of parent samples that have passed through a series of processing is fed from the in-apparatus conveyance path to the first backbone conveyance line 16.

A plurality of bidirectional transfer units 60 are respectively provided between the first backbone conveyance line 16 and the plurality of pre-analytical processing apparatuses 48 to 54. Each of the bidirectional transfer units 60 has a function of performing forward transfer and a function of performing backward transfer.

In the forward transfer, a rack conveyed by the first backbone conveyance line 16 is a transfer source rack, and a rack to be fed out to the in-apparatus conveyance path is a transfer destination rack. The bidirectional transfer unit 60 sequentially conveys a plurality of sample containers from the transfer source rack to the transfer destination rack. In the backward transfer, a rack fed from the in-apparatus conveyance path is a transfer source rack, and a rack to be fed out to the first backbone conveyance line 16 is a transfer destination rack. The bidirectional transfer unit 60 sequentially conveys the plurality of sample containers from the transfer source rack to the transfer destination rack. A configuration and an operation of the bidirectional transfer unit 60 will be described in detail below with reference to FIG. 7.

In the embodiment, a path through which the worker passes is provided between the pre-analytical processing section 26 and the second transfer station 28, for example. A bridge is provided in the middle of the backbone conveyance mechanism 14 to span the path. The bridge includes two vertical conveyance mechanisms and a horizontal conveyance mechanism that connects the vertical conveyance mechanisms. From the viewpoint of shortening a flow line of the worker on the premise of forward and backward movement of the worker who has passed through the path, an arrangement order of the plurality of pre-analytical processing apparatuses 48 to 54 is determined such that the entire length (the length in the Y-direction) of the plurality of pre-analytical processing apparatuses 48 to 54 gradually decreases in the −X-direction. To reduce a burden on recovery work of waste, each of the pre-analytical processing apparatuses 48 to 54 may be configured such that waste such as a disposable chip is automatically accumulated in its end in the −Y-direction (or its vicinity).

The second transfer station 28 will be described below. The second transfer station 28 is provided between the pre-analytical processing section 26 on the upstream side and the inspection section 30 on the downstream side. More specifically, the second transfer station 28 includes an outer conveyance path 62 having a U shape, an inner conveyance path 64 having the same U shape, and a transfer unit group constituting the transfer apparatus. The outer conveyance path 62 and the inner conveyance path 64 convey a plurality of racks in a counterclockwise direction in FIG. 1.

More specifically, each of the outer conveyance path 62 and the inner conveyance path 64 includes two straight line portions each having a form extending in the Y-direction and a connection portion connecting respective distal ends (ends in the −Y-direction) of the straight line portions. In the present embodiment, the outer conveyance path 62 is a conveyance path that conveys a daughter sample rack produced by pre-analytical processing and a specific parent sample rack that has passed through pre-analytical processing, and the inner conveyance path 64 is a conveyance path that conveys a daughter sample rack and a parent sample rack to be fed to the inspection section 30. Respective functions of the two conveyance paths may be reversed. An empty rack that occurs after sorting and transfer is conveyed by the outer conveyance path 62, for example. The empty rack may be conveyed by the inner conveyance path 64. Alternatively, the empty rack may be conveyed by another conveyance path for recovery.

Out of two ends (ends in the +Y-direction) of the outer conveyance path 62, at least the end on the upstream side is connected to the first backbone conveyance line 16. Both the ends may be connected to the first backbone conveyance line 16. Out of two ends (ends in the +Y-direction) of the inner conveyance path 64, at least the end on the downstream side is connected to the first backbone conveyance line 16. Both the ends may be connected to the first backbone conveyance line 16. In the present embodiment, a plurality of sample racks before sorting and transfer are fed into the outer conveyance path 62 from the first backbone conveyance line 16, and a plurality of sample racks after sorting and transfer are fed out of the inner conveyance path 64 to the first backbone conveyance line 16.

A transfer unit group 66 is roughly classified into a front column 68 and a rear column 70, and each of the front column 68 and the rear column 70 includes a plurality of transfer units 72 arranged in the Y-direction. The plurality of transfer units 72 have the same configuration. That is, each of the transfer units 72 sorts and transfers a plurality of sample containers from the transfer source rack to the transfer destination rack row. In this respect, each of the transfer units 72 within the second transfer station 28 has the same function as that of each of the transfer units 46 within the first transfer station 24.

In the second transfer station 28, 180 sorting types, for example, are assigned to tens of transfer units 72, and the respective functions of the plurality of transfer units 72 are not the same when attention is paid to a correlation among the transfer units 72. One of the sorting types may be assigned to the plurality of transfer units 72, or one of the sorting types may be assigned to the plurality of transfer destination racks in a certain one of the transfer units 72. A configuration and an operation of the transfer unit 72 will be described in detail below with reference to FIG. 8 to FIG. 10.

The parent sample racks after pre-analytical processing, excluding some of them, are fed to the third transfer station without being taken into the second transfer station 28 by the first backbone conveyance line 16. For example, the parent sample rack that has skipped the pre-analytical processing section 26 (the parent sample rack corresponding to a type 6 and a type 7 in FIG. 6 described below) also skips the second transfer station 28, and is fed to the inspection section 30. On the other hand, some of the parent sample racks (the parent sample racks corresponding to the type 5 in FIG. 6 described below) discharged from the pre-analytical processing section 26 are taken into the second transfer station 28, to be a transfer target. A transfer target in each of the transfer stations is appropriately determined depending on a purpose and a specific situation of the system. A relationship among the racks and basic requirements for rack conveyance will be arranged below with reference to FIG. 2.

Then, the inspection section 30 will be described. The inspection section 30 includes a plurality of sub-sections 78 to 84 as a plurality of equipment sets. The sub-sections 78 to 84 are connected in parallel with the first backbone conveyance line 16, and are arranged in a comb shape in the sense. The number of the plurality of sub-sections 78 to 84 is seven or eight, for example. From the viewpoint of facilitating work and shortening a flow line of the worker and from the viewpoint of effectively utilizing a space, an arrangement and an arrangement order of the plurality of sub-sections 78 to 84 are determined.

Each of the sub-sections 78 to 84 includes a plurality of inspection apparatuses and an in-sub-section conveyance path. For example, the sub-section 78 includes a plurality of inspection apparatuses 86 arranged in the Y-direction, and each of the inspection apparatuses 86 includes a plurality of units 90 connected to one another in the X-direction. In the illustrated configuration example, the sub-section 78 also includes a plurality of inspection apparatuses 92 that preliminarily inspect a sample in advance prior to the main inspection of the sample. The plurality of inspection apparatuses 86 and 92 are connected to an in-sub-section conveyance path 88. The in-sub-section conveyance path 88 is connected to the first backbone conveyance line 16 via a bidirectional transfer unit 94.

The sub-section 80 includes a plurality of inspection apparatuses 98 aligned in the Y-direction and an in-sub-section conveyance path 96 to which the inspection apparatuses 98 are connected in the illustrated configuration example. The in-sub-section conveyance path 96 is connected to the first backbone conveyance line 16 via a bidirectional transfer unit 100. The sub-section 82 basically has a similar configuration to that of the sub-section 80. The sub-section 84 includes a plurality of inspection apparatuses 102 and an in-sub-section conveyance path 104. Each of the inspection apparatuses 102 includes a plurality of units 106. In each of the sub-sections 82 and 84, the in-sub-section conveyance path is also connected to the first backbone conveyance line via the bidirectional transfer unit.

Examples of a blood test include a blood count test, a blood glucose test, a biochemical test, and an immunological test. Examples of a urine test include a glucose test, a protein test, a pH test, and an occult blood test. Examples of a fecal test include an occult blood test, a virus test, and a bacteriological test. The illustrated tests include a test to be automatically performed and a test to be manually performed.

In the embodiment, the plurality of sample containers are grouped in a rack unit for each of a large number of inspection types (or test items) by sorting and transfer in the second transfer station 28. The plurality of sample containers are grouped in a rack unit for each of some of the inspection types by sorting and transfer in the first transfer station 24. Each of the racks constituted by the sample containers is fed to the specific sub-section among the sub-sections 78 to 84 in the inspection section 30. Then, the racks are not further fed to the other sub-section. The racks may be conveyed while gradually passing via the plurality of sub-sections.

Then, the third transfer station 32 will be described. The third transfer station 32 is provided between the inspection section 30 on the upstream side and the post-analytical processing section 20 on the downstream side. The third transfer station 32 basically has a similar configuration to that of the second transfer station. More specifically, the third transfer station 32 includes an outer conveyance path 108, an inner conveyance path 110, and a transfer unit group 112. The transfer unit group 112 is roughly divided into a front column 114 and a rear column 116, and each of the front column 114 and the rear column 116 includes a plurality of transfer units 118. In the illustrated configuration example, the number of the transfer units 118 in the third transfer station 32 is smaller than the number of the transfer units 72 in the second transfer station 28.

Each of the transfer units 118 sorts and transfers a plurality of samples from the transfer source rack to the transfer destination rack row depending on a post-analytical processing type corresponding to each of the samples. The transfer source rack is a rack that has passed through a pre-analytical processing process, or is a rack that has been fed to an inspection process without passing through the pre-analytical processing process and has passed through the inspection process. In the present embodiment, a daughter sample container in which an error has been judged to occur in the inspection section 30 is also a transfer target in the third transfer station 32, and a rack that holds the daughter sample container can also be a transfer source rack. In each of the transfer units 118, sample containers are sorted and transferred depending on a post-analytical processing type for each of the samples. The post-analytical processing type is determined depending on a storage method (refrigeration storage or freezing storage), judgment of whether or not it is a return target, and the presence or absence of an error, for example. A sorting and transfer condition in the third transfer station 32 will be described in detail below with reference to FIG. 11.

The post-analytical processing section 20 includes the storage container 21 that automatically stores a sample container. The storage container 21 includes a refrigeration storage container and a freezing storage container. A sample to be a return target is separately recovered, and is returned to the medical institution as a request source. An error sample is separately recovered.

A plurality of empty racks are fed to the first transfer station 24, the second transfer station 28, and the third transfer station 32. In the present embodiment, each of the first backbone conveyance line 16 and the second backbone conveyance line 18 includes an underground conveyance path, and a plurality of empty racks are conveyed in the −X-direction using the underground conveyance paths, and are fed to each of the transfer stations 24, 28, and 32. For example, an underground conveyance path for empty rack conveyance is provided just below the conveyance path 42 in the first transfer station 24. Underground conveyance paths for empty rack conveyance are also respectively provided just below the inner conveyance paths 64 and 110 in the second transfer station 28 and the third transfer station 32. On the downstream side of the first backbone conveyance line 16 and the second backbone conveyance line 18, there are respectively provided stations that feed a plurality of empty racks into the underground conveyance path included in the backbone conveyance lines, illustration of which is omitted.

In the configuration illustrated in FIG. 1, a rack waiting area is provided in a place where the plurality of racks need to be buffered or temporarily stored. For example, a temporary storage station may be provided between the inspection section 30 and the third transfer station 32.

A branch conveyance path 74 is a conveyance path for conveying a plurality of racks to be conveyed to an inspection section other than the inspection section 30 among the plurality of racks discharged from the second transfer station 28 within the first sub-system 10 and/or a second transfer station within the second sub-system 12. The other inspection section is provided on another floor, for example. In the case, the plurality of racks are conveyed in a vertical direction by an up-and-down mechanism. One or a plurality of communication lines 76 may be provided between the first backbone conveyance line 16 and the second backbone conveyance line 18, and may be configured such that the rack can freely move back and forth between the backbone conveyance lines 16 and 18.

Figure 2:
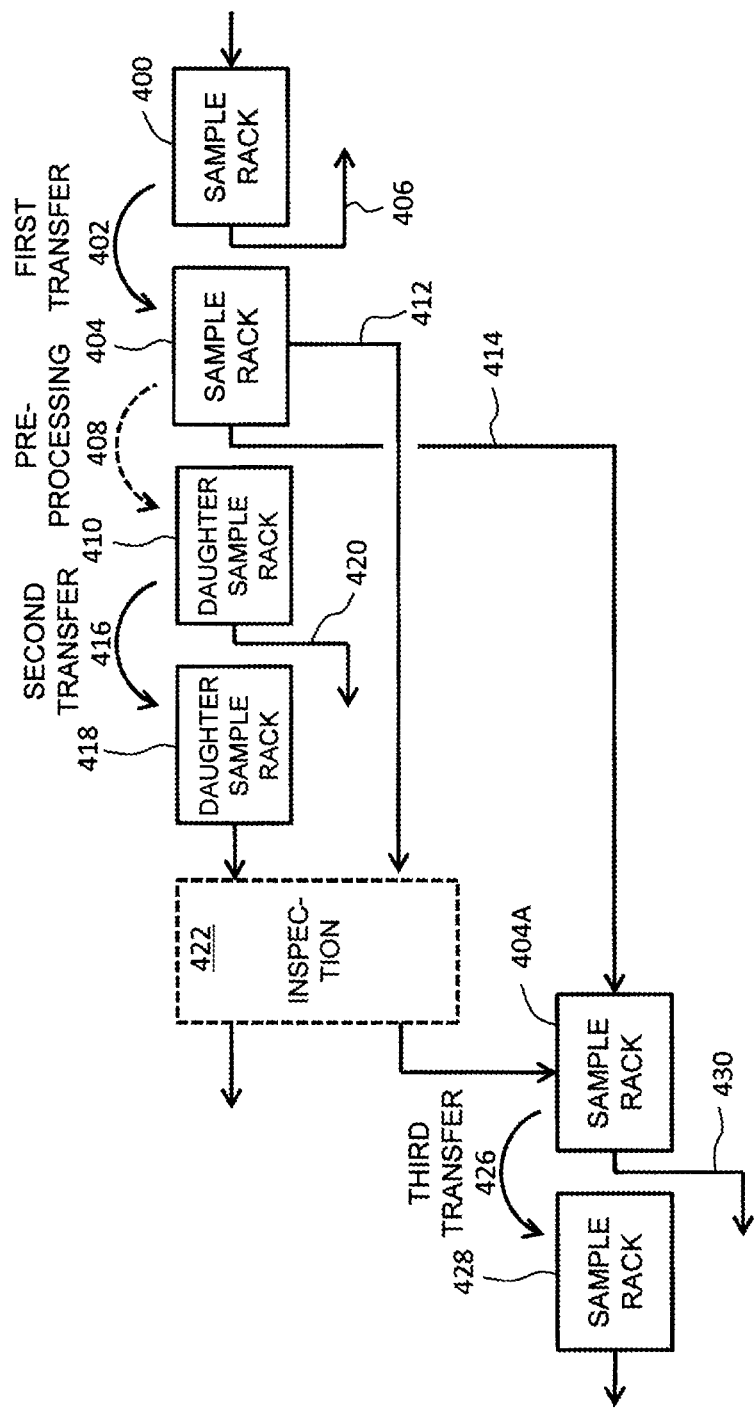
FIG. 2 is a conceptual diagram illustrating a relationship among a plurality of racks.

FIG. 2 schematically illustrates a relationship among a plurality of sample racks. A sample rack 400 is a rack carried from the medical institution. Through first transfer 402, a plurality of sample containers held in the sample rack 400 are sorted. One of a plurality of sample racks that have thus occurred is illustrated as a sample rack 404. Examples of the sample rack 404 include one to be fed to an inspection section as it is (see reference numeral 412) and one to be a target of pre-analytical processing 408. An empty rack that has occurred in the first transfer 402 is recovered (see reference numeral 406).

Through the pre-analytical processing 408, a plurality of daughter samples are produced from a plurality of parent samples held in the sample rack 404, and a daughter sample rack 410 that holds the plurality of daughter samples is produced. Through subsequent second transfer 416, a plurality of sample containers held in the daughter sample rack 410 are sorted. One of a plurality of daughter sample racks that have thus occurred is a daughter sample rack 418. The daughter sample rack 418 is fed to an inspection section. Reference numeral 420 indicates an empty rack that has occurred in the second transfer 416.

The sample racks after the pre-analytical processing (the parent sample racks), excluding some of them, are directly fed to a third transfer station (see reference numeral 414). The sample rack that has passed through inspection 422 in the inspection section without passing through the pre-analytical processing 408 is also fed to the third transfer station. The racks are each represented as a sample rack 404A. Although some of the parent sample racks after the pre-analytical processing are fed to a second transfer station, illustration thereof is omitted. An empty rack that has occurred in the inspection 422 is recovered. Although some of the daughter sample racks after the inspection 422 are fed to the third transfer station, its illustration is omitted. Through third transfer 426, a plurality of sample containers held in the sample rack 404A are sorted. A plurality of sample racks caused by the sorting occur. One of the sample racks is illustrated as a sample rack 428. An empty rack that has occurred in the third transfer 426 is recovered (see reference numeral 430). Post-analytical processing is applied to the sample rack 428. Respective racks themselves in the sample racks 404, 410, 418, 404A, and 428 illustrated in FIG. 2 may be made the same, or may be made different. The parent sample container and the daughter sample container may be composed of the same container, or may be respectively composed of different containers.

According to the embodiment, a configuration of the simultaneous feeding sample group can be adapted to subsequent processing by sorting and transfer among the sections. Accordingly, a processing efficiency in the subsequent processing is enhanced, and a conveyance efficiency is enhanced. Particularly, the configuration in the embodiment can flexibly deal with various inspection requests and the inspection requests in large amounts.

Figure 3:
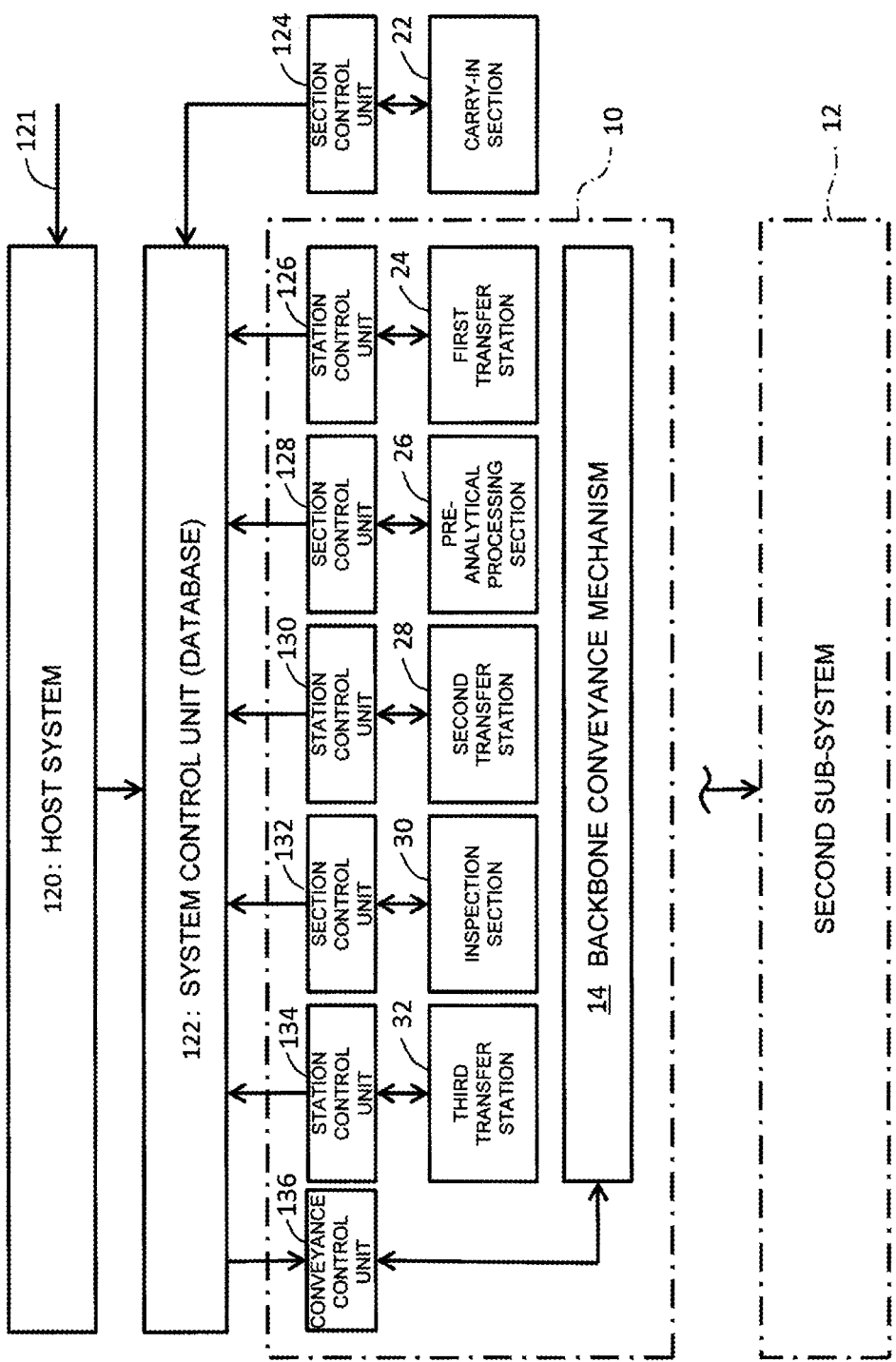
FIG. 3 is a block diagram illustrating the sample processing system according to the embodiment.

FIG. 3 illustrates a configuration of the sample processing system according to the embodiment as a block diagram. The illustrated configuration is merely exemplary, and various configurations can be adopted.

The carry-in section 22, the pre-analytical processing section 26, the inspection section 30, and the like are provided from the upstream side to the downstream side in rack conveyance. The post-analytical processing section is provided in a stage succeeding the inspection section 30. The plurality of transfer stations are provided among the plurality of sections. More specifically, the first transfer station 24, the second transfer station 28, and the third transfer station 32 are provided. The plurality of sections 22, 26, and 30 and the plurality of transfer stations 24, 28, and 32 are connected to the backbone conveyance mechanism 14.

Inspection request information 121 is fed to a host system 120 from the medical institution. The whole of the inspection request information 121 or a portion required for system control in the inspection request information 121 is delivered to a system control unit 122.

The system control unit 122 includes a processor and controls the plurality of sections 22, 26, and 30, respectively, via a plurality of section control units 124, 128, and 132, and controls the plurality of transfer stations 24, 28, and 32, respectively, via a plurality of station control units 126, 130, and 134. Further, the system control unit 122 controls the backbone conveyance mechanism 14 via a conveyance control unit 136. Actually, the system control unit 122 includes a database, and the database is referred to by each of the control units 124 to 136. As a result, information required in each of the controls is acquired. For example, in the database, request institution information, patient information, information for specifying an inspection content (a processing code, an test code, etc.), and the like are managed for each sample ID as a sample identifier. Each management table for control, described below, may be dynamically configured based on information within the database. Each of the control units 126 to 136 may include a processor or a control device. The second sub-system 12 has a similar configuration to that of the first sub-system 10.

Then, sorting and transfer in the first transfer section will be specifically described with reference to FIG. 4 to FIG. 6. Elements already described are respectively assigned the same reference numerals, and description thereof is omitted. The same applies for each of FIG. 5 and the subsequent drawings.

Figure 4:
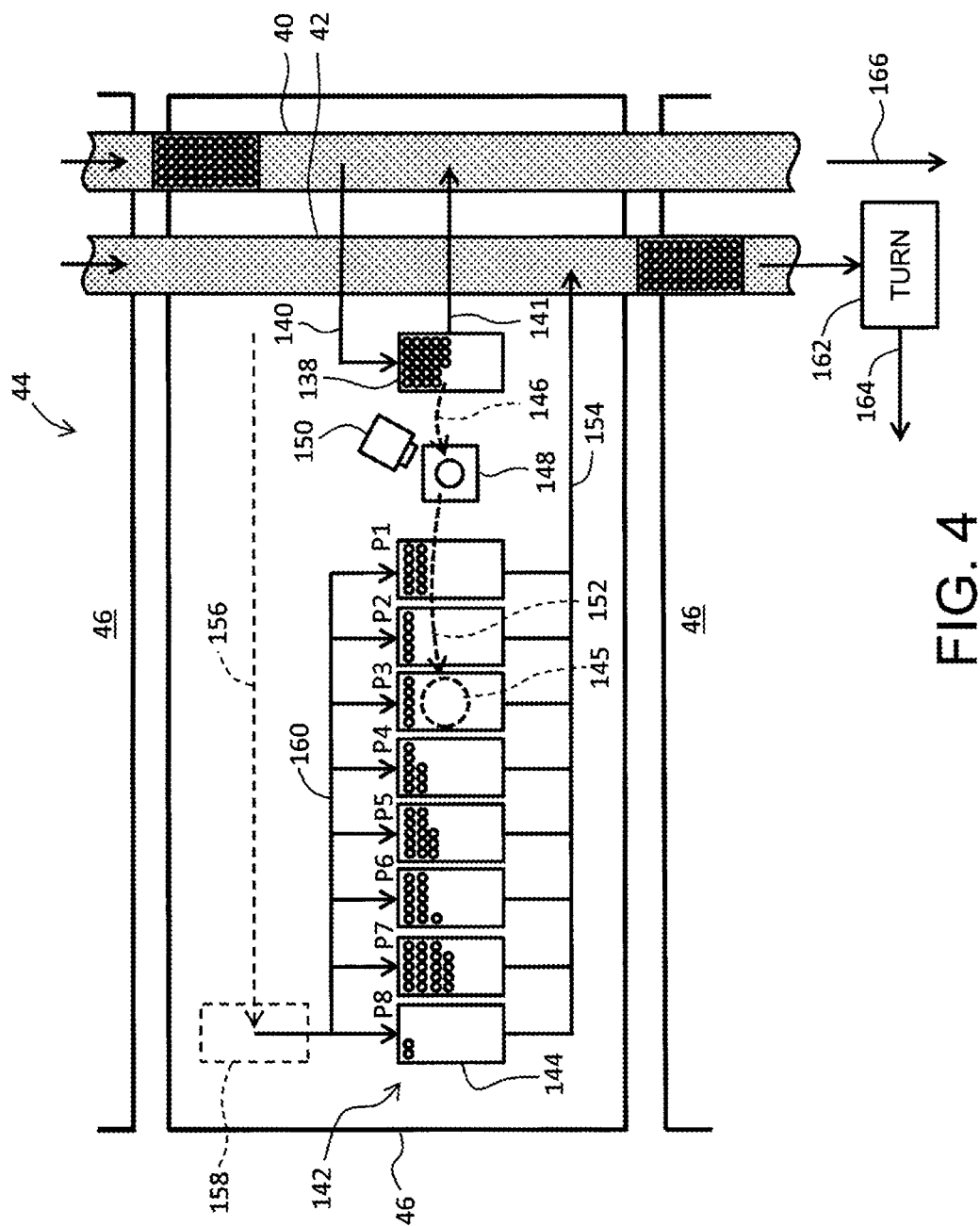
FIG. 4 is a conceptual diagram illustrating an example of sorting and transfer in a first transfer station.

FIG. 4 schematically illustrates the conveyance path 40, the conveyance path 42, the transfer unit group 44, and the like. In an illustrated configuration example, the conveyance path 40 conveys a rack transferred by a transfer robot, and the conveyance path 40 conveys an empty rack after the sorting and transfer. The conveyance path 42 conveys a transfer completion rack.

In each of the transfer units 46, a rack is drawn from the conveyance path 40, and the rack is a transfer source rack 138. The transfer source rack 138 is located at a predetermined position. A plurality of transfer destination positions P1 to P8 are determined in each of the transfer units 46, and a transfer destination rack row 142 is located at the transfer destination positions. The transfer destination rack row 142 includes a plurality of transfer destination racks 144. The number of transfer destination racks is eight, for example. A manipulator 145 takes out a sample container from the transfer source rack 138, and the sample container is conveyed to the transfer destination rack row 142. The manipulator 145 includes a grasp mechanism for grasping the sample container and a mechanism for three-dimensionally conveying the grasp mechanism. The grasp mechanism includes a plurality of fingers and a mechanism for driving the plurality of fingers to open or close.

A camera 150 and a bar code reader 148 are provided in the middle of a conveyance path of the sample container. The bar code reader 148 includes a hole containing the sample container and a mechanism for rotating the sample container contained in the hole in the illustrated configuration example. The direction of the sample container is adjusted such that a bar code label affixed to the sample container has a predetermined direction. An optical beam scan for the bar code label, together with the bar code label, reads a bar code. Information about the reading includes a sample ID. The bar code may be read as an image.

Before and after the bar code label is read, the camera 150 picks up an image of the sample container, and thus acquires a container image. The type of the sample container is specified by analyzing the container image. A property of a sample may be analyzed by analyzing the image, or an error sample container such as a sample container having a small internal capacity may be identified. A broken line 146 indicates a conveyance path from a transfer source rack to the bar code reader 148. A broken line 152 indicates a conveyance path from the bar code reader 148 to a transfer destination rack.

A processing code is specified based on a sample ID acquired from each of sample containers. A type in which a sample is processed is specified based on the processing code. Alternatively, a type in which a sample is processed is specified from a type of a sample container specified by analyzing a container image. The type is to be sorting information. In sorting and transfer, based on sorting information for each of the sample containers, a destination to which the sample container is transferred is selected. In the illustrated configuration example, a specific one of the eight transfer destination racks 144 is selected, and the sample container is inserted into the transfer destination rack. Such a process is performed for each of the sample containers.

In any one of the transfer destination racks, if a fully loaded state has occurred or if a timeout condition has been satisfied, the transfer destination rack is fed into the conveyance path 42 as a transfer completion rack (see reference numeral 154). If the transfer source rack 138 has become empty, the empty rack is fed into the conveyance path 40, for example. Then, the rack that holds the plurality of sample containers is taken into the transfer unit 46, and is a new transfer source rack 138.

An underground conveyance path is provided just below the conveyance path 40, and a plurality of empty racks are fed to each of the transfer units 46 using the underground conveyance path. An underground conveyance path 156 is also formed in each of the transfer units 46, and an elevator 158 is provided at an end on the deeper side of the underground conveyance path 156. The empty rack is fed by the underground conveyance path 156 and the elevator 158, and is fed into an empty transfer destination position (see reference numeral 160).

Each of the racks has a rectangular-shaped form as viewed from above, and has a longer side direction and a shorter side direction. In the conveyance path 40 and the conveyance path 42, each of the racks is conveyed while the longer side direction is parallel to a conveyance direction. A turn unit 162 is provided between the conveyance path 42 and a first backbone conveyance line. The turn unit 162 is a mechanism for rotating the rack that has reached the turn unit 162 by 90 degrees. The rack after the rotation is fed into the first backbone conveyance line (see reference numeral 164).

In the first backbone conveyance line, each of the racks is conveyed such that the longer side direction is parallel to the conveyance direction. The first backbone conveyance line includes a plurality of conveyance paths. The first backbone conveyance line will be described below with reference to FIG. 7. In the illustrated configuration example, the empty rack fed into the conveyance path 40 is fed to a recovery station (see reference numeral 166).

A plurality of transfer source racks may be simultaneously taken into each of the transfer units 46. That is, sorting and transfer may be performed for each of the sample containers between the transfer source rack row and the transfer destination rack row 142. A plurality of manipulators may be operated in parallel so long as interference thereamong can be prevented.

Figure 5:
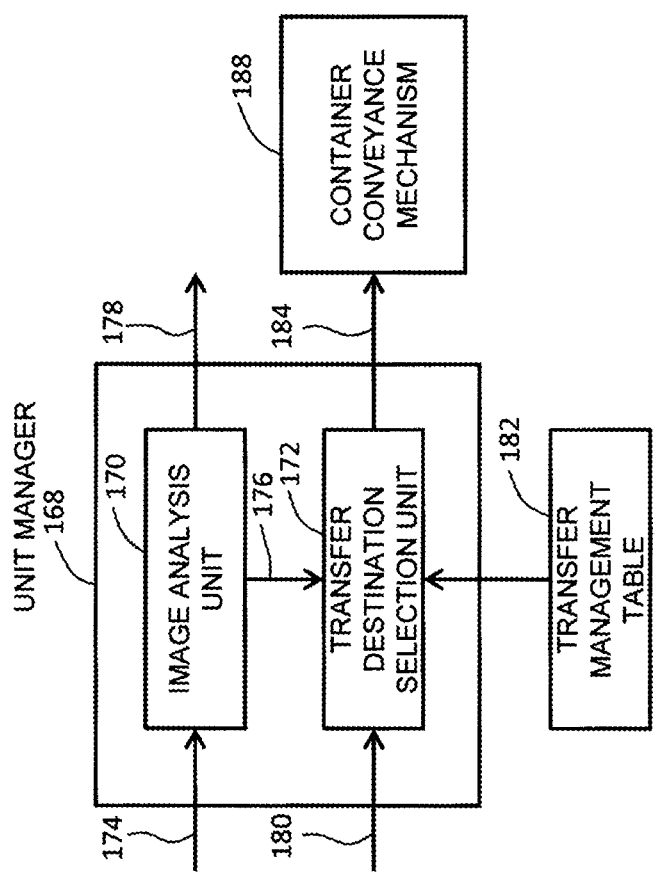
FIG. 5 is a block diagram illustrating an example of a configuration related to control of a transfer unit.

FIG. 5 illustrates a configuration related to control of the transfer units. For example, a unit management unit 168 may be provided for each of the transfer units. The station control unit 126 illustrated in FIG. 3 includes a plurality of unit management units 168 that respectively control operations of the plurality of transfer units.

In a configuration example illustrated in FIG. 5, the unit manager 168 includes an image analysis unit 170 and a transfer destination selection unit 172. The image analysis unit 170 analyzes a container image, and specifies a type of sample container. It is judged whether or not a sample is an error sample. If there is a problem in a property of the sample or if an amount of the sample is small, for example, judgment is made as to whether or not an error has occurred in a sample. The sample in which the error has been judged to occur is an error sample. Examples of information to be delivered from the image analysis unit 170 to the transfer destination selection unit 172 include information for specifying a type of sample container and information for specifying whether or not the sample is an error sample. If the error has been judged to occur, information 178 representing the error is fed to an error processing section.

The transfer destination selection unit 172 specifies a type of processing to be applied in the future to the sample based on the type of sample container, and selects, from among a plurality of transfer destinations, the transfer destination corresponding to the specified type of processing. The transfer destination selection unit 172 may obtain information 180 about a processing code corresponding to a sample ID from a system control unit and select, from among the plurality of transfer destinations, the transfer destination specified by the processing code. The transfer destination may be selected based on both the type of sample container and the processing code. Information representing a transfer destination is fed from a transfer destination selection unit 184 to a container conveyance mechanism 188. The container conveyance mechanism 188 is a mechanism including the above-described manipulator. The container conveyance mechanism 188 may control rack conveyance, or another control unit within the unit management unit 168 may control rack conveyance. A transfer management table 182 stores therein information to be referred to by the transfer destination selection unit 172 when the transfer destination is selected.

FIG. 6 illustrates a sorting and transfer condition. Types 1 to 8 respectively correspond to numbers #1 to #8 of transfer destination racks. The presence or absence of pre-analytical processing and a content of the pre-analytical processing can be specified using a processing code 192, and a transfer destination rack 194 can be selected based on the processing code 192 if a content of inspection can be specified. In the case, a table in which the processing code 192 and the transfer destination rack 194 are associated with each other may be prepared as the above-described transfer management table. In the case, to transfer an error sample to the transfer destination rack #8, pieces of information 196 and 206 each representing the presence or absence of an error are used.

On the other hand, if a content of pre-analytical processing in a pre-analytical processing section and a content of processing in an inspection section can be specified regardless of a processing code, the transfer destination rack 194 can be selected based on information 198 and 200 respectively representing the contents. For example, if a processing type can be specified from a container type, the transfer destination rack 194 can be selected from the container type.

More specifically, any one of #1 to #7 is selected as the transfer destination rack 194 depending on judgment as to whether or not centrifugation processing 202 is required and a aliquot method or depending on an inspection type in an inspection section. Examples of the aliquot method 204 include a 1:1 aliquot method and a 1:N aliquot method. The former aliquot method is a method of producing one daughter sample from one parent sample, and the latter aliquot method is a method of producing any number N of daughter samples from one parent sample. N is an integer of two or more. Examples of the inspection type include a blood count test and a blood glucose test. In the tests, a sample container is directly fed to the inspection section without passing through a pre-analytical processing section. Accordingly, in a first stage of sorting and transfer, sample containers directed toward the tests are sorted.

The sample containers may be sorted according to a condition other than illustrated conditions. When the sample containers are sorted from a container type or a processing content (a pre-analytical processing content and an inspection content), a table configured by associating information indicated by reference numeral 194 with information indicated by reference numeral 190 is used as a transfer management table, for example.

Figure 7:
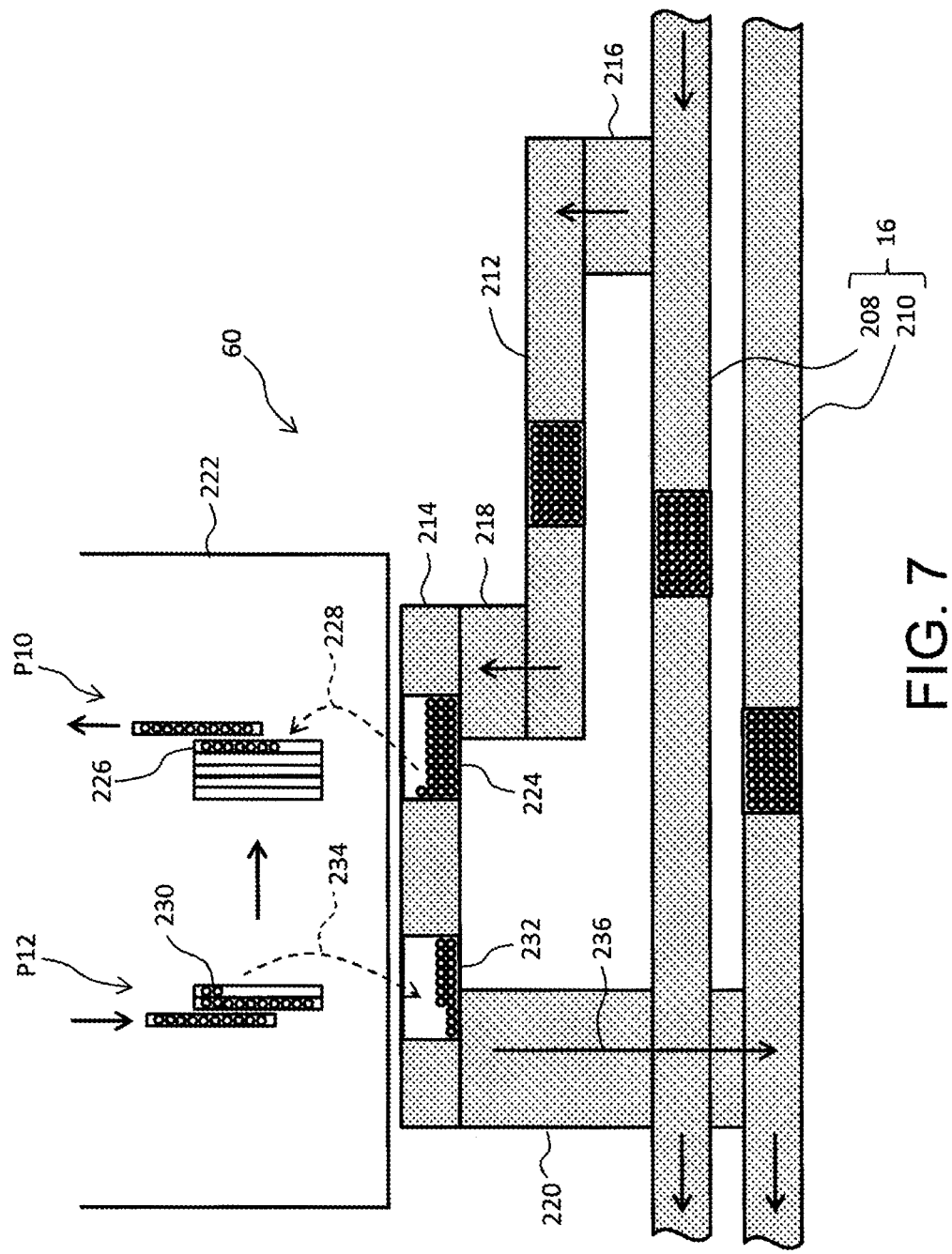
FIG. 7 is a conceptual diagram illustrating an example of a bidirectional transfer unit.

FIG. 7 illustrates a configuration example of the bidirectional transfer unit 60. The first backbone conveyance line 16 includes a first backbone conveyance path 208 and a second backbone conveyance path 210. The first backbone conveyance path 208 is a conveyance path that conveys a plurality of racks directed toward any one of pre-analytical processing apparatuses. The second backbone conveyance path 210 is a passing conveyance path that conveys a rack that has been subjected to pre-analytical processing and a rack to be directly fed to the inspection section. Respective functions of the two backbone conveyance paths 208 and 210 can be appropriately determined depending on a situation.

In an illustrated configuration example, a buffer conveyance path 212 and a front conveyance path 214 are provided parallel to the first backbone conveyance path 208. Reference numerals 216, 218, and 220 respectively indicate traverse mechanisms. A rack is fed to the buffer conveyance path 212 from the first backbone conveyance path 208 via the traverse mechanism 216. The buffer conveyance path 212 functions as a buffer allowing a plurality of racks to wait. The rack is fed from the buffer conveyance path 212 to the front conveyance path 214 via the traverse mechanism 218. The plurality of racks are held in the front conveyance path 214. The racks include a transfer source rack 224 and a transfer destination rack 232. Both the racks 224 and 232 are respectively daughter sample racks. Each of the traverse mechanisms 216, 218, and 220 is composed of a traverser that conveys a rack in a direction perpendicular to an original traveling direction (an apparatus that transfers a rack on a conveyance path to another conveyance path), for example.

On the other hand, a receiving position P10 and a feeding position P12 are determined in a conveying carriage 222 provided on the side of the pre-analytical processing apparatus. A transfer destination rack 226 is located at the receiving position P10, and a transfer source rack 230 is located at the feeding position P12. A rack to be conveyed by the first backbone conveyance line 16 is a rack containing 5×10 sample containers, for example. A rack to be conveyed by the conveying carriage 222 and the pre-analytical processing apparatus is a rack containing 1×10 sample containers, for example.

A large-sized rack is used because sample containers in large amounts need to be conveyed in the first backbone conveyance line 16. On the other hand, a small-sized or slender rack is used because a large-shaped rack is difficult to handle in each of the pre-analytical processing apparatuses. This also applies to the inside of the inspection section. A rack used in the inspection section need not match a rack used in the pre-analytical processing section. Dedicated racks may be respectively used in each of the pre-analytical processing apparatuses and each of the inspection apparatuses.

In the present embodiment, the bidirectional transfer unit 60 includes two manipulators. The manipulators concurrently perform bidirectional transfer. The first manipulator transfers a plurality of sample containers forward to the transfer destination rack 226 from the transfer source rack 224, as indicated by reference numeral 228. The second manipulator transfers a plurality of sample containers backward to the transfer destination rack 232 from the transfer source rack 230, as indicated by reference numeral 234. An empty rack that has occurred by completion of the forward transfer is used as a subsequent transfer destination rack 232. If the transfer destination rack 232 has entered a fully loaded state or if a timeout condition has been satisfied, the transfer destination rack 232 is fed as a transfer completion rack to the second backbone conveyance path 210, as indicated by reference numeral 236.

As described above, the bidirectional transfer unit 60 can replace the racks. Accordingly, both a conveyance condition to be required for the backbone conveyance line and a conveyance condition to be required in the pre-analytical processing apparatus can be satisfied.

The backward transfer may be performed in a backward path after the forward transfer indicated by reference numeral 228. Similarly, the forward transfer may be performed in a backward path after the forward transfer indicated by the reference numeral 234. In the case, two transfer source racks and two transfer destination racks may be provided on the front conveyance path 214. By such a configuration, the number of sample containers to be transferred per unit time can be increased.

Figure 8:
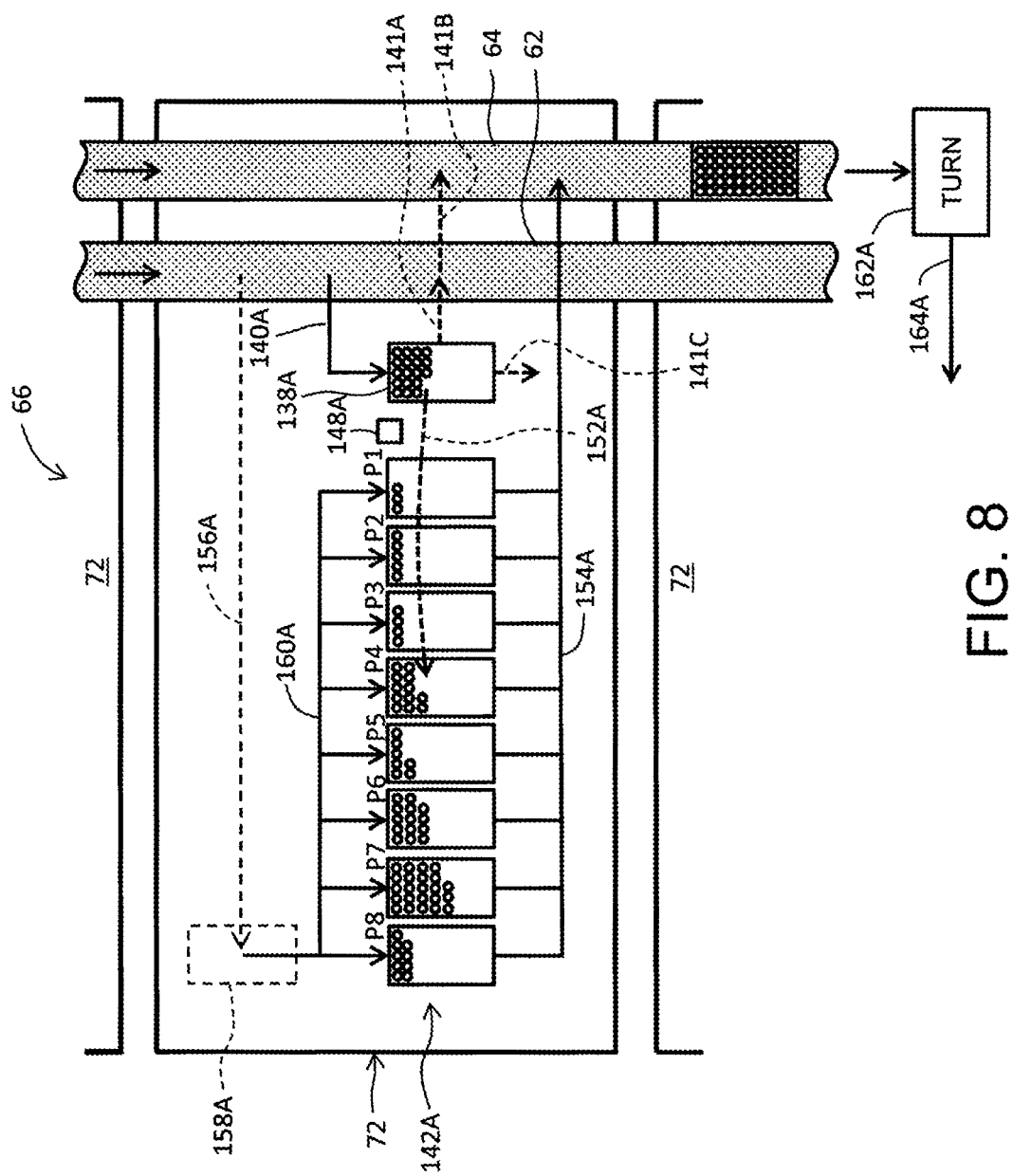
FIG. 8 is a conceptual diagram illustrating an example of sorting and transfer in a second transfer station.

Then, the second transfer station will be described in detail with reference to FIG. 8 to FIG. 10. FIG. 8 illustrates the outer conveyance path 62, the inner conveyance path 64, the transfer unit group 66, and the like. In an illustrated configuration example, a plurality of specific racks that have come from the pre-analytical processing section are drawn into the outer conveyance path 62 from the first backbone conveyance line. The racks are distributed and conveyed to the transfer unit group 66 by the outer conveyance path 62. The inner conveyance path 64 conveys a plurality of transfer completion racks that have been subjected to sorting and transfer in the second transfer station. A turn unit is provided at a connection portion between the first backbone conveyance line and the outer conveyance path 62. In addition thereto, one or a plurality of turn units are provided, as needed, on the first backbone conveyance line.

The transfer units 72, excluding some of them, have the same configuration as the configuration of the transfer units 46 illustrated in FIG. 4. In FIG. 8, a rack taken in from the outer conveyance path 62 is located at a predetermined position, as indicated by reference numeral 140A. The rack is a transfer source rack 138A. On the other hand, a plurality of transfer destination positions P1 to P8 are determined in the transfer unit 72, and a transfer destination rack row 142A is located at the transfer destination positions. A manipulator (not illustrated) conveys a sample container from the transfer source rack 138A to a selected transfer destination rack (see reference numeral 152A). In the case, a bar code reader 148A reads a bar code label affixed to the sample container. As a result, a sample ID is specified. A content of processing to be applied in the future to a sample within the sample container and specifically a content of inspection is specified based on the sample ID. A sorting destination of the sample container is selected according to the content of the inspection and specifically an inspection code representing the content of the inspection. In performing such control, the database within the system control unit is referred to, or a transfer management table described below is referred to, for example. In the illustrated example, there are eight sorting destinations (transfer destinations) per one transfer unit 72.

As already described, 180 sorting destinations, for example, are assigned to the entire transfer unit group 66. In second sorting and transfer, a first sorting and transfer condition is determined such that the same rack need not be conveyed to the plurality of transfer units 72.

As indicated by reference numeral 154A, a transfer destination rack that has been fully loaded or a transfer destination rack that has satisfied a timeout condition is fed out as a transfer completion rack to the inner conveyance path 64. If the transfer source rack 138A becomes empty, the empty rack is fed into the outer conveyance path 62 (see reference numeral 141A), or the empty rack is fed into the inner conveyance path 64 (see reference numeral 141B), or the empty rack is fed into a dedicated recovery path (see reference numeral 141C).

A turn unit 162A is provided between the inner conveyance path 64 and the first backbone conveyance line. The turn unit 162A is a mechanism for changing a direction of a rack by 90 degrees. The rack the direction of which has been changed is conveyed by the first backbone conveyance line (see reference numeral 164A), and is fed to the inspection section.

Figure 9:
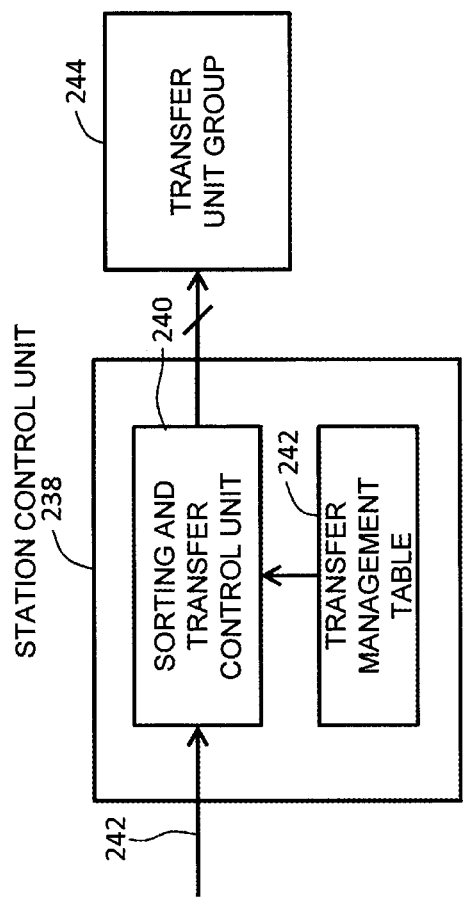
FIG. 9 is a block diagram illustrates an example of a configuration related to control of the second transfer station.

FIG. 9 illustrates a station control unit 238 that controls an operation of the second transfer station. The station control unit 238 corresponds to the station control unit 130 illustrated in FIG. 3.

The station control unit 238 illustrated in FIG. 9 includes a sorting and transfer control unit 240 and a transfer management table 242 in an illustrated configuration example. For example, information representing an test code is given to the sorting and transfer control unit 240 from the system control unit 122. The sorting and transfer control unit 240 refers to the transfer management table, to judge a transfer unit corresponding to the test code and select a transfer destination rack corresponding to the test code. Information for specifying the judged transfer unit and information for specifying the selected transfer destination rack are fed to a transfer unit group 244. A sorting and transfer control unit may be provided for each of transfer units.

FIG. 10 illustrates a configuration example of the transfer management table. Information 248 for specifying a transfer unit in charge and information 250 for specifying a transfer destination rack are managed for each test code 246. The transfer unit in charge is a transfer unit in charge of sorting and transfer for a sample container to which inspection to be specified by the test code 246 is applied. For example, 180 types of test codes exist. Inspection corresponding to a part 252 of the test codes is performed in the inspection section. Inspection corresponding to a remaining part 254 is performed in another inspection section.

The third transfer station has the same configuration as the configuration of the second transfer station. As already described, the number of transfer units included in the third transfer station is smaller than the number of transfer units included in the second transfer station. In the third transfer station, a plurality of sample containers are sorted and transferred depending on a content of post-analytical processing. The number of sorts is six, for example. The number of sorts in the third transfer station may be determined depending on a situation.

FIG. 11 illustrates a sorting and transfer condition in each of the transfer units in the third transfer station. Types 1 to 8 respectively correspond to transfer destination racks #1 to #8. In sorting and transfer, a post-analytical processing code 256 is referred to, and a transfer destination rack corresponding to a type of post-analytical processing represented by the post-analytical processing code 256 is selected. For example, a post-analytical processing type is defined based on a storage method 262 and the presence or absence of another processing 264. Examples of the storage method 262 include refrigeration and freezing. Examples of the other processing 264 include processing before storage and processing after storage. To each of a sample container that is required to be returned and a sample container in which an error has occurred, a transfer destination rack containing the sample container is assigned.

According to the above-described sorting and transfer condition, the transfer destination racks #1 and #2 are conveyed to a refrigerator in a storage container, for example. The transfer destination racks #3 and #4 are conveyed to a freezer in a storage container. The transfer destination rack #5 is conveyed to a return station. The transfer destination rack #6 is fed to an error processing section.

According to the above-described sorting and transfer condition, a post-analytical processing efficiency can be enhanced by grouping a plurality of sample containers after inspection or after post-analytical processing, depending on a content of post-analytical processing. The sorting and transfer condition illustrated in FIG. 11 is exemplary, and another sorting and transfer condition may be adopted.

Figure 12:
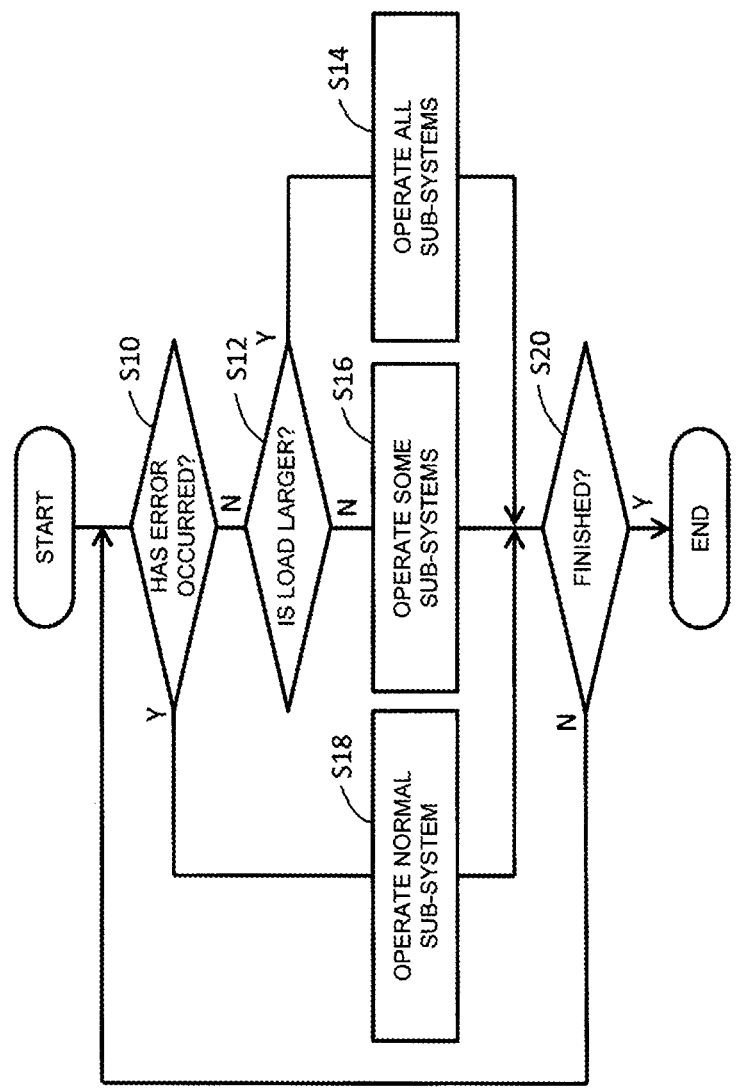
FIG. 12 is a flowchart illustrating an example of an operation of the sample processing system.

FIG. 12 illustrates an example of an operation of the sample processing system. In S10, it is judged whether or not an error has occurred in a first sub-system and a second sub-system. If the error has occurred, then in S18, control to operate only a normal sub-system in which an error has not occurred is performed. If it is judged in S10 that the error has not occurred, then in S12, it is judged whether or not a load is larger than a predetermined value. If the load is larger than the predetermined value, then in S14, control to operate all sub-systems is performed. If it is judged in S12 that the load is smaller than the predetermined value, then in S16, control to operate some of the sub-systems and specifically either one of the sub-systems is performed. Until it is judged in S20 that the processing has been finished in S20, S10 and subsequent steps are repeatedly performed.

The sample processing system according to the embodiment enables a risk that the entire system is stopped to be reduced because there are provided a first sub-system and a second sub-system that have a symmetrical relationship and operate independently of each other. An operation portion can be adaptively changed depending on a load status.

Figure 13:
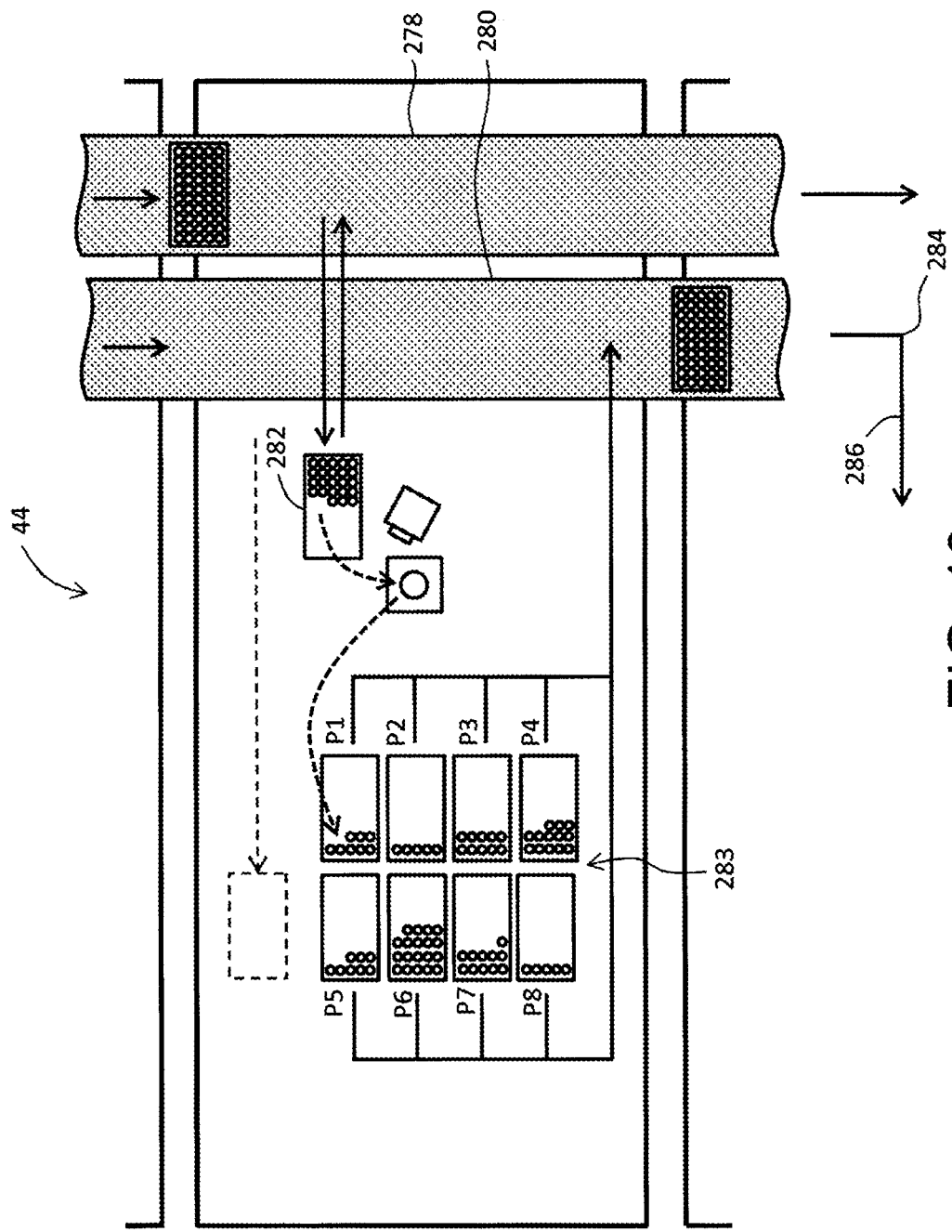
FIG. 13 is a diagram illustrating a modification of a first transfer station.

FIG. 13 illustrates a modification of the transfer unit 46 provided in the first transfer station. In a conveyance path 278 and a conveyance path 280, each of racks is conveyed while a shorter side direction of the rack is made parallel to a conveyance direction. The rack taken in from the conveyance path 278 is a transfer source rack 282. Sample containers are sorted and transferred from the transfer source rack 282 to a transfer destination rack row 283. A shorter side direction of the transfer source rack 282 is parallel to a conveyance direction of the conveyance paths 278 and 280. The transfer destination rack row 283 includes eight transfer destination racks two-dimensionally arranged. A shorter side direction of the transfer destination racks is parallel to the conveyance direction of the conveyance paths 278 and 280.

A transfer completion rack is fed out to the conveyance path 280. Then, the transfer completion rack is conveyed while its shorter side direction is made parallel to a conveyance direction, and is fed out to a first backbone conveyance line from the conveyance path 280, as indicated by reference numeral 286. According to the modification, a turn unit need not be provided between the conveyance path 280 and the first backbone conveyance line. A conveyance manner illustrated in FIG. 4 is referred to as vertical conveyance or longitudinal conveyance, and a conveyance manner illustrated in FIG. 13 is referred to as horizontal conveyance or lateral conveyance.

Figure 14:
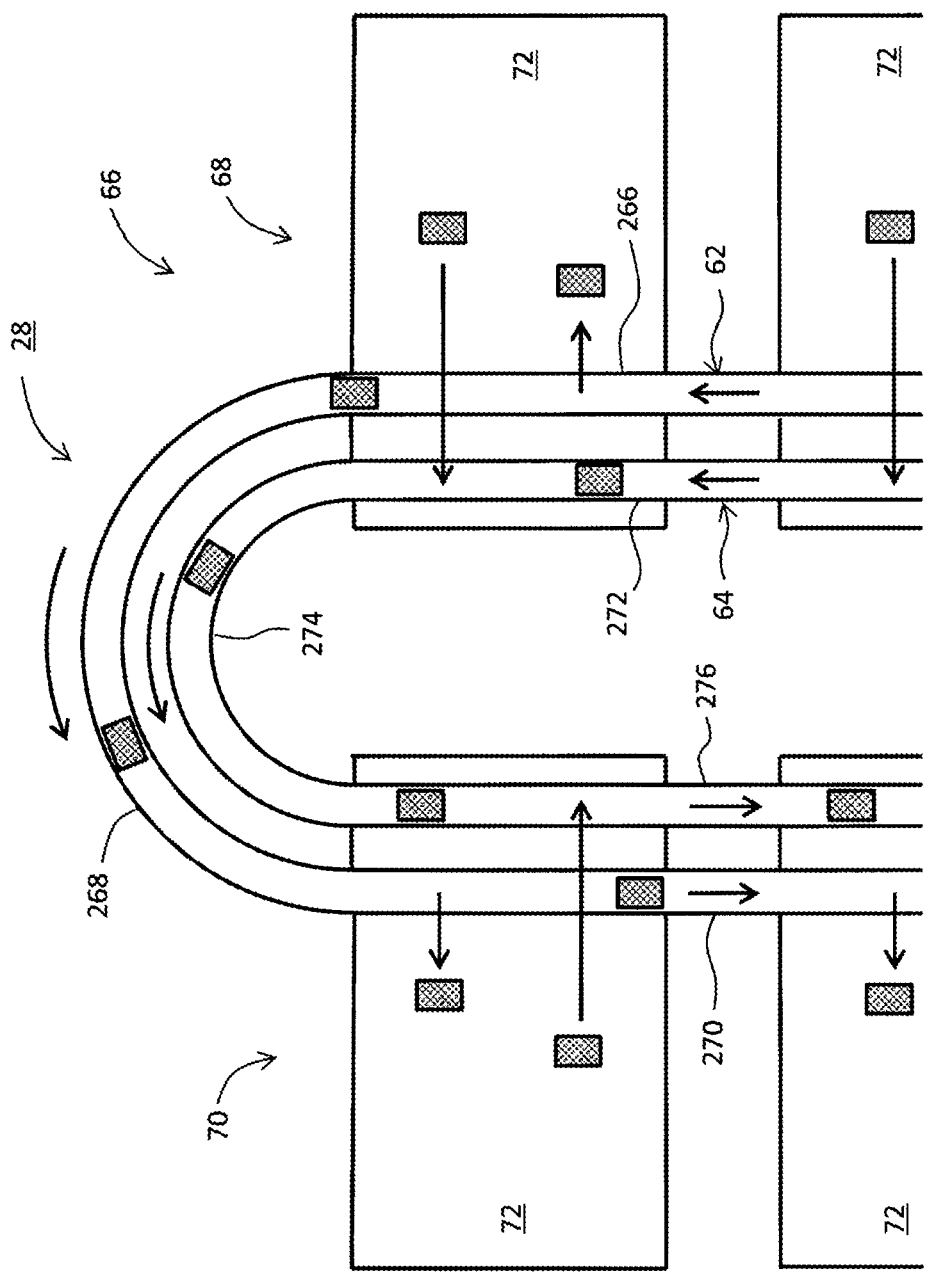
FIG. 14 is a diagram illustrating a modification of a second transfer station.

FIG. 14 illustrates a modification of the second transfer station 28. A transfer unit group 66 is roughly divided into a front column 68 and a rear column 70, and each of the columns includes a plurality of transfer units 72. The second transfer station 28 includes an outer conveyance path 62 having a U-shaped form and an inner conveyance path 64 similarly having a U-shaped form. The outer conveyance path 62 includes a straight path 266, a circular arc path 268, and a straight path 270. Similarly, the inner conveyance path 64 includes a straight path 272, a circular arc path 274, and a straight path 276. In the circular arc paths 268 and 274, a rack is conveyed in a circular arc shape.

According to the modification, in rack conveyance in the outer conveyance path 62 and the inner conveyance path 64, a traverse mechanism need not be provided, so that a configuration can be simplified, and particularly a direction of a rack can be naturally maintained in a conveyance process. As a result, an advantage that a configuration of the plurality of transfer units 72 constituting the front column 68 and a configuration of the plurality of transfer units 72 constituting the rear column 70 can be made the same is obtained.

Although in the above-described embodiment the large-scale sample processing system has been configured, a transfer station or a transfer apparatus may be provided in a small-scale sample processing system. A transfer station or a transfer apparatus may be provided between pieces of equipment in a sample pre-analytical processing system and an inspection system.

The invention claimed is:

1. A transfer apparatus comprising:
a container transfer mechanism configured to transfer while sorting a plurality of sample containers simultaneously and in parallel from a transfer source rack to a transfer destination rack row prior to processing the sample containers; and
a controller configured to control the container transfer mechanism and select for each of the sample containers a specific transfer destination rack from the transfer destination rack row as a transfer destination of the sample container based on information representing a process to be applied in the future to a sample within the sample container.

2. The transfer apparatus according to claim 1, wherein the transfer apparatus is provided between a first section and a second section, the first section being upstream of the second section,
the transfer source rack is arranged to be fed into the transfer apparatus from the first section, and
a transfer completion rack arranged to be fed out of the transfer apparatus to the second section.

3. The transfer apparatus according to claim 2, further comprising:
a plurality of transfer units provided between the first section and the second section, wherein
each of the transfer units includes the container transfer mechanism, and
a plurality of container transfer mechanisms respectively included in the plurality of transfer units operate in parallel.

4. The transfer apparatus according to claim 2, wherein the second section is a pre-analytical processing section that is provided on an upstream side of an inspection section that performs sample inspection and performs sample pre-analytical processing, and
the process to be applied in the future includes at least a content of the sample pre-analytical processing.

5. The transfer apparatus according to claim 4, wherein the transfer destination rack row includes:
a plurality of transfer destination racks respectively corresponding to a plurality of sample pre-analytical processing processes in the sample pre-analytical processing, and
a plurality of transfer destination racks respectively corresponding to a plurality of sample inspection processes in the sample inspection, and
the process to be applied in the further includes a content of the sample inspection.

6. The transfer apparatus according to claim 2, wherein the first section is a pre-analytical processing section that performs sample pre-analytical processing,
the second section is an inspection section that performs sample inspection, and
the process to be applied in the future includes a content of the sample inspection.

7. The transfer apparatus according to claim 2, wherein the first section is an inspection section that performs sample inspection,
the second section is a post-analytical processing section that performs sample post-analytical processing, and
the process to be applied in the future includes at least a content of the sample post-analytical processing.

8. A sample processing system comprising:
a plurality of sections provided from a first side to a second side in rack conveyance, the first side being upstream of the second side; and
a plurality of transfer stations provided among the plurality of sections, wherein
each of the transfer stations includes a container transfer mechanism that is configured to transfer while sorting a plurality of sample containers simultaneously and in parallel from a transfer source rack fed in from a first section to a transfer destination rack row prior to processing the sample containers,
a controller configured to select a specific transfer destination rack, for each of the sample containers to be a transfer target, from the transfer destination rack row as a transfer destination of the sample container based on information representing a process to be applied in the future to a sample within the sample container in each of the transfer stations, and
a transfer completion rack arranged to be conveyed from each of the transfer stations to a second section, the second section being downstream to the first section.

9. The sample processing system according to claim 8, further comprising
a backbone conveyance line to which the plurality of sections and the plurality of transfer stations are connected,
the plurality of sections include a carry-in section into which the plurality of sample containers are carried and a pre-analytical processing section that performs sample pre-analytical processing, and
the plurality of transfer stations include a first transfer station provided between the carry-in section as the first section and the pre-analytical processing section as the second section.

10. The sample processing system according to claim 9, wherein
the plurality of sections further include an inspection section that performs sample inspection, and
the plurality of transfer stations further include a second transfer station provided between the pre-analytical processing section as the first section and the inspection section as the second section.

11. The sample processing system according to claim 10, wherein
the plurality of sections further include a post-analytical processing section configured to perform sample post-analytical processing, and
the plurality of transfer stations further include a third transfer station provided between the inspection section as the first section and the post-analytical processing section as the second section.

12. A conveyance method in a sample processing system comprising a plurality of sections provided from a first side to a second side in rack conveyance, the first side being upstream of the second side, the conveyance method comprising:
- transferring while sorting a plurality of sample containers simultaneously and in parallel from a transfer source rack fed in from a first section to a transfer destination rack row prior to processing the sample containers in a transfer station provided between at least two of the sections, and
- conveying a transfer completion rack from the transfer station to a second section, the second section being downstream of the first section,
- wherein in the step of transferring while sorting the sample containers, a specific transfer destination rack is selected, for each of the sample containers to be a transfer target, from the transfer destination rack row as a transfer destination of the sample container based on a process to be applied in the future to a sample within the sample container.

* * * * *